(12) United States Patent
Cox

(10) Patent No.: US 6,484,829 B1
(45) Date of Patent: Nov. 26, 2002

(54) BATTERY POWERED STAIR-CLIMBING WHEELCHAIR

(76) Inventor: Kenneth Ray Cox, 2711 E. Marquis Cir, Arlington, TX (US) 76016-2013

( * ) Notice: Subject to any disclaimer, the term of this patent is extended or adjusted under 35 U.S.C. 154(b) by 44 days.

(21) Appl. No.: 09/609,732

(22) Filed: Jul. 3, 2000

(51) Int. Cl.[7] ............................................. B62D 57/028
(52) U.S. Cl. ........................................ 180/8.1; 180/8.3
(58) Field of Search .......................... 180/8.1, 8.2, 8.3, 180/8.7

(56) References Cited

U.S. PATENT DOCUMENTS

| | | | |
|---|---|---|---|
| 2,931,449 A | | 4/1960 | King |
| 4,512,588 A | | 4/1985 | Cox |
| 4,674,584 A | | 6/1987 | Watkins |
| 4,794,999 A | | 1/1989 | Hester |
| 5,423,563 A | * | 6/1995 | Wild ........................ 280/250.1 |
| 5,579,857 A | | 12/1996 | Abe et al. |
| 5,701,965 A | | 12/1997 | Kaman et al. |
| 5,975,225 A | * | 11/1999 | Kamen et al. ................. 180/21 |
| 6,311,794 B1 | * | 11/2001 | Morrell et al. ............... 180/8.3 |

* cited by examiner

Primary Examiner—Kevin Hurley

(57) ABSTRACT

A self-propelled battery-powered wheelchair replaces an ordinary wheelchair and provides improved access to homes. The wheelchair includes stair climbing, slope climbing, and reclining while requiring only minimal driver skill and strength. Operation on level ground is similar to the operation of a conventional wheelchair. Support for normal operation is provided by a rear caster and wheels on the front corners. Its compact width and length enable negotiating narrow doorways and turning in small spaces. To ensure stability on stairs, moveable skids are mounted to the four corners of the wheelchair. Parallelogram linkages move the front skids down and forward during climbing. Another parallelogram linkage moves the caster and rear skids up and at an angle during climbing. The wheelchair is steerable on stairs as needed to align with the stair path and accommodate slightly spiraling stairs. The wheelchair accommodates stair steps of different riser heights and tread lengths. A pair of spoked or spider wheels with small wheels at the ends of the spokes are rotably mounted to the sides of the wheelchair. The spider wheels engage the stairs to propel and stabilize the wheelchair during climbing of stairs. Methods are provided to monitor and control the pitch attitude of the wheelchair and nearness of wheelchair supporting components to the stairs. Motion and control are provided by electric motors, sensors, a computer, and driver inputs. Propulsion power for conventional level operation, slope climbing, and stair climbing operation is transmitted through the same motors and wheels.

8 Claims, 33 Drawing Sheets

RALA- APPROACH ASCENDING STAIRS- ADJUST

```
SPA= JLE*(SP1L*(1-SP5L))-JLE*(SP6L*(1-SP5L))
KEA= JLE*(6-KGA)/6
CEA= JLE*(6-CGA)/6
```

RBLA - APPROACH ASCENDING STAIRS- MOVEMENT

```
DLA= 0.05*JLA*((12-CGA)/12)
DRA= 0.05*JRA*((12-CGA)/12)

SPA= JLE*(SP1L*(1-SP5L))-JLE*(SP6L*(1-SP5L))
KEA= JLE*(6-KGA)/6
CEA= JLE*(6-CGA)/6
```

RALB - ASCENDING STAIRS- ADJUST

```
KEA= JLE* ((9-KGA)/12-CAA/0.24)
CEA= JLE*((9-CGA)/12+CAA/0.18)
```

RBLB- ASCENDING STAIRS- MOVEMENT

```
DLA=-0.05*JLA*(SGA/6-1)*(1-CGA/24-KGA/24)
DRA=-0.05*JRA*(SGA/6-1)*(1-CGA/24-KGA/24)

SPA= JLE*NSDL*(SGA/12)*2*(1-KGA/24-CGA/24)*(12-SGA)/12
KEA= JLE* ((9-KGA)/12-CAA/0.24)
CEA= JLE*((9-CGA)/12+CAA/0.18)
```

*Fig. 31A*

RALD- APPROACH DESCENDING STAIR- ADJUST

```
SPA=-JLE*(1-KGA/12)*(1-CGA/12)*(-0.12-CAA)/0.12
KEA= JLE*(6-KGA)/6
CEA= JLE*(6-CGA)/6
```

RBLD- APPROACH DESCENDING STAIRS- MOVEMENT

```
DLA= 0.05*JLA
DRA= 0.05*JRA

SPA=-JLE*(1-KGA/12)*(1-CGA/12)*(-0.12-CAA)/0.12
KEA= JLE*(6-KGA)/6
CEA= JLE*(6-CGA)/6
```

RALE- DESCENDING STAIRS- ADJUST

```
KEA= JLE* ((9-KGA)/18+(-0.12-CAA)/0.24)
CEA= JLE*((9-CGA)/12-(-0.12-CAA)/0.18)
```

RBLE- DESCENDING STAIRS- MOVEMENT

```
DLA= 0.05*JLA*(SGA/12)*(1-CGA/24-KGA/24)
DRA= 0.05*JRA*(SGA/12)*(1-CGA/24-KGA/24)

SPA=-JLE*NSDL*2*(1-KGA/24-CGA/24)*(12-SGA)/12
KEA= JLE* ((9-KGA)/18+(-0.12-CAA)/0.24)
CEA= JLE*((9-CGA)/12-(-0.12-CAA)/0.18)
```

RALF- END DESCENDING STAIRS- ADJUST

```
SPA= JLE*(SP1L*(1-SP5L))-JLE*(SP6L*(1-SP5L))
KEA= JLE*(6-KGA)/6
CEA= JLE*(6-CGA)/6
```

RBLF- END DESCENDING STAIRS- MOVEMENT

```
DLA= 0.05*JLA*(CGA/12)
DRA= 0.05*JRA*(CGA/12)

SPA= JLE*(SP1L*(1-SP5L))-JLE*(SP6L*(1-SP5L))
KEA= JLE*(6-KGA)/6
CEA= JLE*(6-CGA)/6
```

*Fig. 31B*

Fig. 34A- Wheelchair before recline
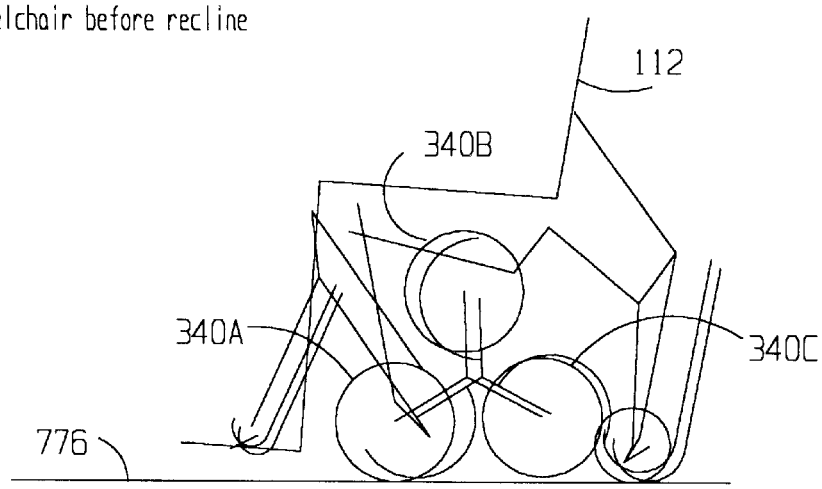
Fig. 34B- Wheelchair during recline
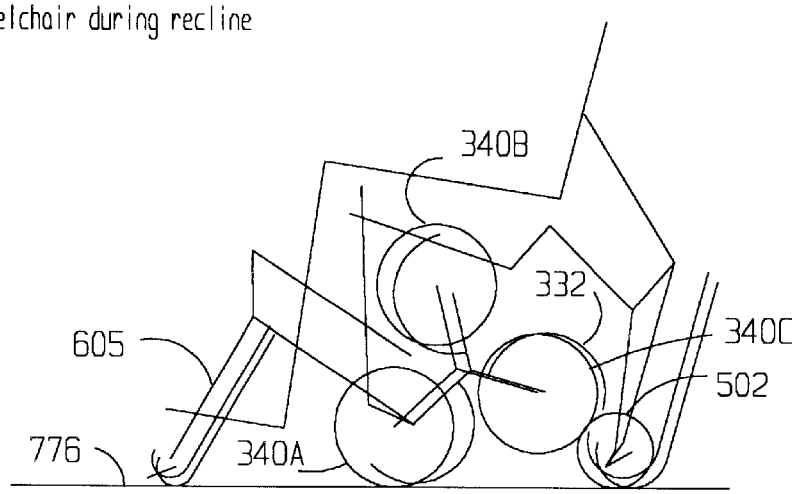
Fig. 34C- Wheelchair reclined
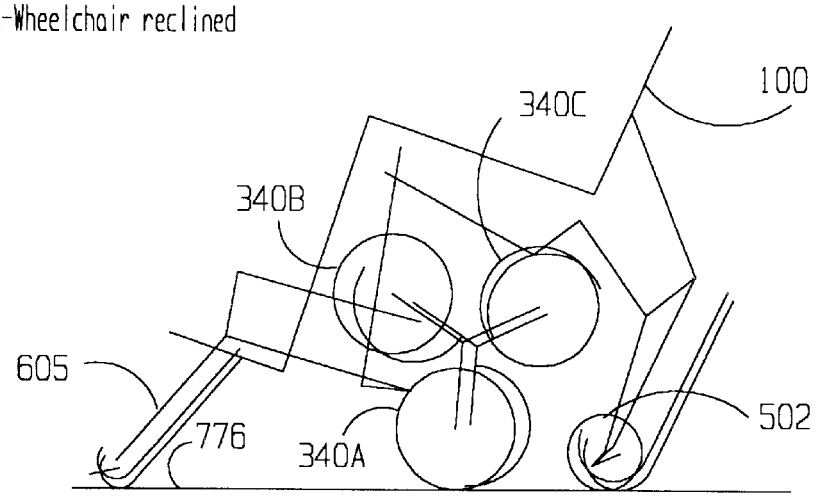
Fig. 34

BATTERY POWERED STAIR-CLIMBING WHEELCHAIR

CROSS REFERENCE TO RELATED APPLICATION

One object of this application to define an improvement over my previously patented stair-climbing wheelchair (U.S. Pat. No. 4,512,588) entitled "Stair Climbing Wheel Chair". This new design offers a narrower width and requires less driver strength and skill.

BACKGROUND—TECHNICAL FIELD OF INVENTION

This invention relates generally to stair-climbing wheelchairs that are propelled by battery-powered electric motors and are driver-controlled.

BACKGROUND—DISCUSSION OF PRIOR ART

The mobility of persons who do not enjoy the full use of their legs and feet has been restricted by the absence of an economical and dependable way of negotiating obstacles such as curbs, steps, stairs, and narrow doorways, etc. Persons who cannot walk have therefore been denied the same kind of freedom that others routinely take for granted. The absence of mobility and freedom of travel for those who cannot walk has not gone unnoticed. Many talented persons have devoted their creative genius to the fabrication of vehicles that purport to provide this desired mobility. The various solutions that have been offered from time to time may be broadly divided into three main categories as follows: 1) endless track or belt; 2) spider wheel, including 2-, 3-, 4-, 5-, and even 6-wheel configurations; and 3) other devices, including those which teach the use of articulated struts, etc.

The endless track/belt category uses tracks or belts like those employed on a bulldozer or a military tank. Examples include U.S. Pat. No. 4,154,315 to Rasmussen entitled "Chassis For Stair-Climbing Vehicles"; U.S. Pat. No. 4,044,850 to Winsor entitled "Wheelchair"; and U.S. Pat. No. 4,061,199 to Last entitled "Chassis For A Vehicle Capable of Travelling Over Obstructions."

The spider wheel category uses wheels that have multiple spokes with a small diameter wheel at the end of each spoke. The spokes visually suggest the legs of a spider. An example of a 2-wheel spider wheel is found in U.S. Pat. No. 5,701,965 to Kamen et al. entitled "Human Transporter". Examples of 3-wheel spider wheel-type chairs include the following U.S. Pat. No. 3,241,848 to Flory entitled "Stair-Climbing Vehicle"; U.S. Pat. No. 2,931,449 to C. A. King entitled "Occupant-Controlled, Self-Propelled, Obstruction-Climbing Vehicle"; and U.S. Pat. No. 2,742,973 to H. A. I. Johannesen entitled "Powered Invalid Chair and Handle Control Therefor." Examples of 4-wheel spider wheel-type chairs include: U.S. Pat. No. 4,512,588 to Cox entitled "Stair Climbing Wheel Chair" and U.S. Pat. No. 3,580,344 to Floyd entitled "Stair-Negotiating Wheel Chair or an Irregular-Terrain-Negotiating Vehicle". An example of a 5-wheeled device (as well as 3,4,6 or more wheels) is shown in U.S. Pat. No. 255,693 to J. C. Tauber entitled "Stair Truck." A 6-wheeled construction is shown in U.S. Pat. No. 3,208,544 to Colvin entitled "Stepping Wheel Vehicle."

Examples of constructions that employ cylinders and movable pistons include U.S. Pat. No. 3,269,478 to Joslyn entitled "Stair Climbing Wheel Chair"; U.S. Pat. No. 3,550,709 to Hottel entitled "Self-Powered Climbing Hand Truck"; and U.S. Pat. No. 3,417,831 to Lake entitled "Hand Truck with Power Lift."

Regrettably, most of the above-described patents have focused attention only on the problem of getting up and down stairways. It must be recognized that wheelchairs face other barriers besides stairs. In order to take full advantage of the stair-climbing capability, the wheelchair must also accommodate those other barriers.

A major problem with many wheelchairs, whether of the stair-climbing variety or otherwise, is the width of the wheelchair. Many electrically-powered wheelchairs have been proposed in the past which are too bulky. They are large and are incapable of passing through narrow doorways. In the United States many doors leading to bathrooms are only 61-centimeters (24-inches) wide. Interior trim that usually sticks out more than a few centimeters makes the practical width of these doorways about 55.9-centimeters (22-inches). An ideal wheelchair should be less than 55.9-centimeters (22-inch) to provide a minimal amount of clearance during passage into and out of a bathroom. It should still provide a wheelchair seat that is as wide as possible—for the personal comfort of the driver. Most of these previous commendable efforts have provided mechanisms that are bulky and cumbersome. They cannot meet the spatial requirements of the real world. Some wheelchairs did provide access through narrow passageways and tight turning areas. However, they required upper body strength and reach for holding on to handrails for stair climbing. Some wheelchair designs failed to provide safe stability during stair climbing in the event of an unintentional loss of battery power or control system failure.

Another problem faced by some who desire improved mobility is pressure sores that develop from sitting too long in one place. Reclining the seat and seat back can relieve this problem. Such systems are available on some conventional wheelchairs and would be beneficial on stair-climbing wheelchairs as well. Steep slopes are another obstacle faced by wheelchairs.

SUMMARY

In accordance with the present invention a stair-climbing wheelchair comprises a seat and a frame with spoked wheels on either side. There is a small wheel at the end of each spoke. A pitch-attitude sensing device and computer-controlled pitch attitude-adjusting skids on front and rear corners of the frame maintain the wheelchair seat level during stair climbing. There is at least one battery (and probably two), two motors for propelling the wheelchair, one other motor for rotating the spoked wheels, and two conventional electric-powered screw type actuators for positioning the front skids and the rear skids with caster.

OBJECTS AND ADVANTAGES

Accordingly, besides the objects and advantages of the stair-climbing wheelchair described in my above patent, several objects and advantages of the present invention are:

(a) to provide a wheelchair that can accommodate stairs, steps, slopes, narrow doorways, and tight turning spaces normally seen in homes, businesses, or places visited by the public;

(b) to provide a stair-climbing wheelchair that will enter narrow doorways and still provide wide and comfortable seating;

(c) to provide a stair-climbing wheelchair that can accommodate users while requiring very minimal driver skill and strength;

(d) to provide a stair-climbing wheelchair that also functions as a normal powered wheelchair without compromise to that function;
(e) to provide a stair-climbing wheelchair with the fewest possible restrictions, such as accommodating: variable step riser and tread geometries, narrow stair width, small stair landing size, lack of hand rails, low tread friction, and tread roughness;
(f) to provide a stair-climbing wheelchair that is passively secure on the stairs even with unintended loss of power, control system failure, or loss of control system stability;
(g) to provide the driver with a smooth comfortable ride on stairs with a feeling of confidence and without fear of unsafe operations;
(h) to provide an electrically-powered wheelchair that can climb steep slopes; and
(i) to provide an electrically-powered wheelchair that can recline the seat and seat back.

Still further objects and advantages will become apparent from a consideration of the ensuing description and drawings.

DRAWING FIGS

FIG. 31A shows response equations of wheelchair motions for ascending stairs.

FIG. 31B shows the response equations of the wheelchair motions for descending stairs.

FIGS. 34A through 34C depict a series of the wheelchair positions as it reclines.

REFERENCE NUMERALS IN DRAWINGS

| | |
|---|---|
| 40 | center of gravity |
| 50 | joystick |
| 52 | control panel |
| 53 | full/off/limited speed range switch |
| 54 | level mode switch/light |
| 55 | stair mode switch/light |
| 56 | slope mode switch/light |
| 57 | recline mode switch/light |
| 100 | wheelchair frame |
| 112 | wheelchair |
| 146 | seat |
| 147 | seat back |
| 148 | horizontal-reference plane |

-continued

| | |
|---|---|
| 200 | leg rest |
| 201 | armrest |
| 327 | drive wheel gear system |
| 329 | spider wheel rotation axis |
| 330 | spider wheel spoke A,B,C |
| 331 | spider wheel shaft |
| 332 | spider wheel (left) |
| 333 | central gear |
| 334 | spider wheel (right) |
| 335 | idler gear |
| 337 | drive wheel shaft |
| 340 | drive wheels (left side) A,B,C |
| 342 | drive wheels (right side) A,B,C |
| 346 | pinion gear |
| 402 | propulsion drive (right hand) |
| 404 | pinion (right hand) |
| 406 | miter gear (right hand) |
| 409 | planetary gear system |
| 410 | pinion spider wheel drive |
| 411 | miter gear, spider wheel drive |
| 412 | planetary carrier |
| 413 | planetary shaft |
| 414 | planet gear |
| 415 | planet gear |
| 416 | fixed internal gear |
| 417 | internal gear |
| 430 | optical encoder (left) |
| 431 | optical encoder (ref) |
| 432 | optical encoder (right) |
| 433 | engagement sensing cam (left) |
| 434 | engagement sensing cam (right) |
| 435 | engagement sensing shaft (left) |
| 436 | sensing disk (left) |
| 437 | gearing (left) |
| 438 | sensing disk (ref) |
| 439 | spider wheel sensing disk |
| 440 | gearing (ref) |
| 441 | sensing disk (right) |
| 443 | band of 384 radial bars |
| 444 | band of 3 radial bars |
| 445 | spider wheel position optical encoder |
| 446 | spoke indexing optical encoder |
| 468 | propulsion motor (left) |
| 469 | spider wheel motor |
| 470 | propulsion motor (right) |
| 502 | rear caster |
| 503 | caster pivot axis |
| 505 | rear skids |
| 518 | caster four bar linkage |
| 519 | caster hanger |
| 520 | caster motor |
| 521 | caster actuator |
| 530 | spring loaded link |
| 531 | centering arm |
| 532 | roller |
| 533 | caster swivel bearings |
| 534 | caster shaft |
| 535 | caster position potentiometer |
| 536 | extension sensing bell crank |
| 544 | caster wheels A,B |
| 559 | caster-support cross shaft |
| 569 | link |
| 570 | arm |
| 571 | actuation arm |
| 605 | front skids |
| 606 | skid runner |
| 607 | runner four bar linkage |
| 608 | runner position potentiometer |
| 609 | skid ends |
| 620 | front skids actuator motor |
| 621 | front skids actuator |
| 622 | front skids torque tube |
| 623 | skid arm |
| 624 | skid link |
| 625 | skid support link |
| 635 | skid linkage |
| 640 | long link skids |
| 650 | balancing devices (rear caster 502, rear skids 505, & front skids 605) |
| 701–754 | control logic paths |
| 775 | stair-landing wall |
| 776 | floor |
| 777 | step |
| 778 | slope |
| 801 | control system |
| 802 | DC batteries |

DESCRIPTION—FIGS. 1, 2, AND 3—PREFERRED EMBODIMENT

Figure 1:
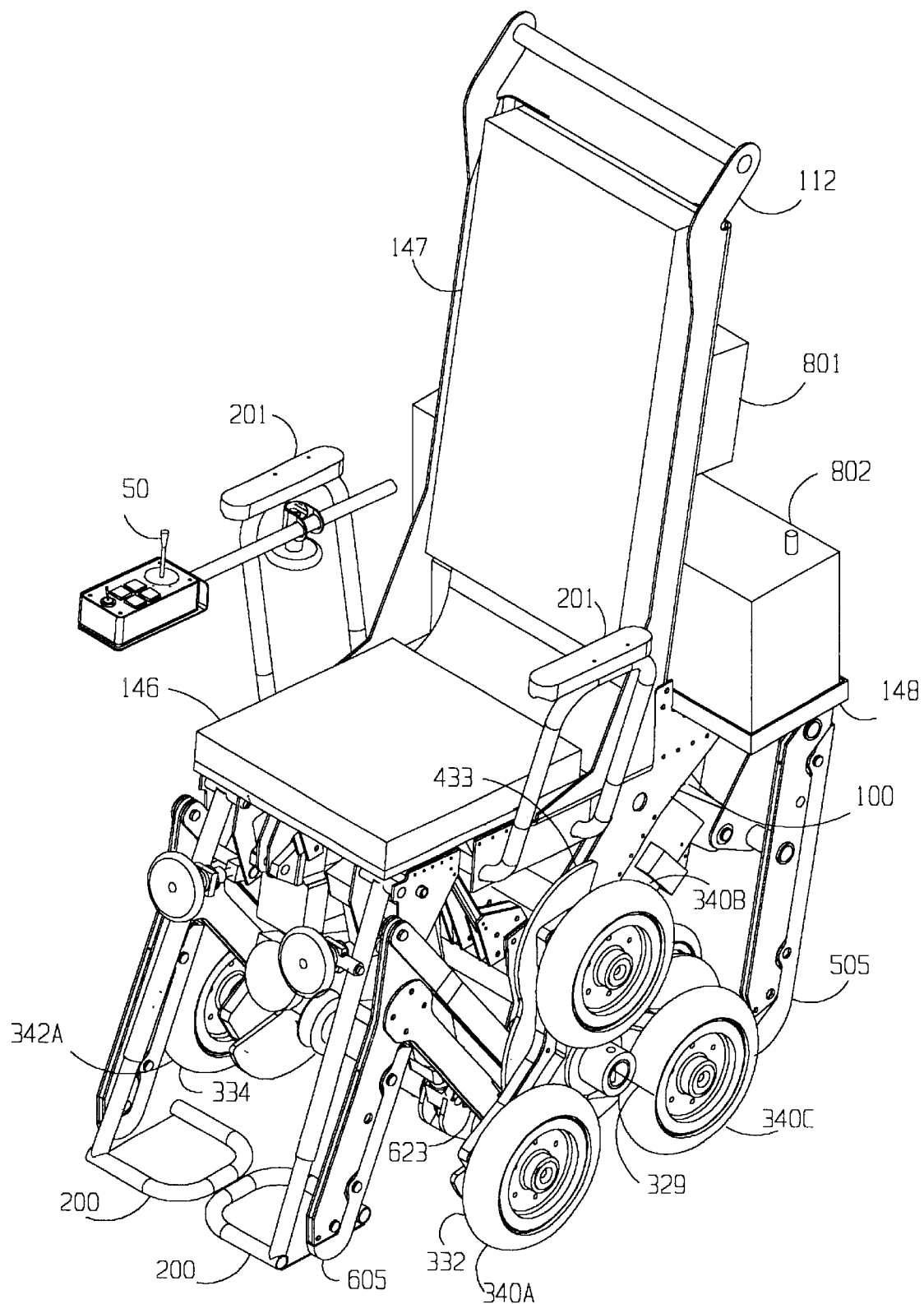
FIG. 1 is an isometric view of a stair-climbing wheelchair being configured for level travel.
Figure 2:
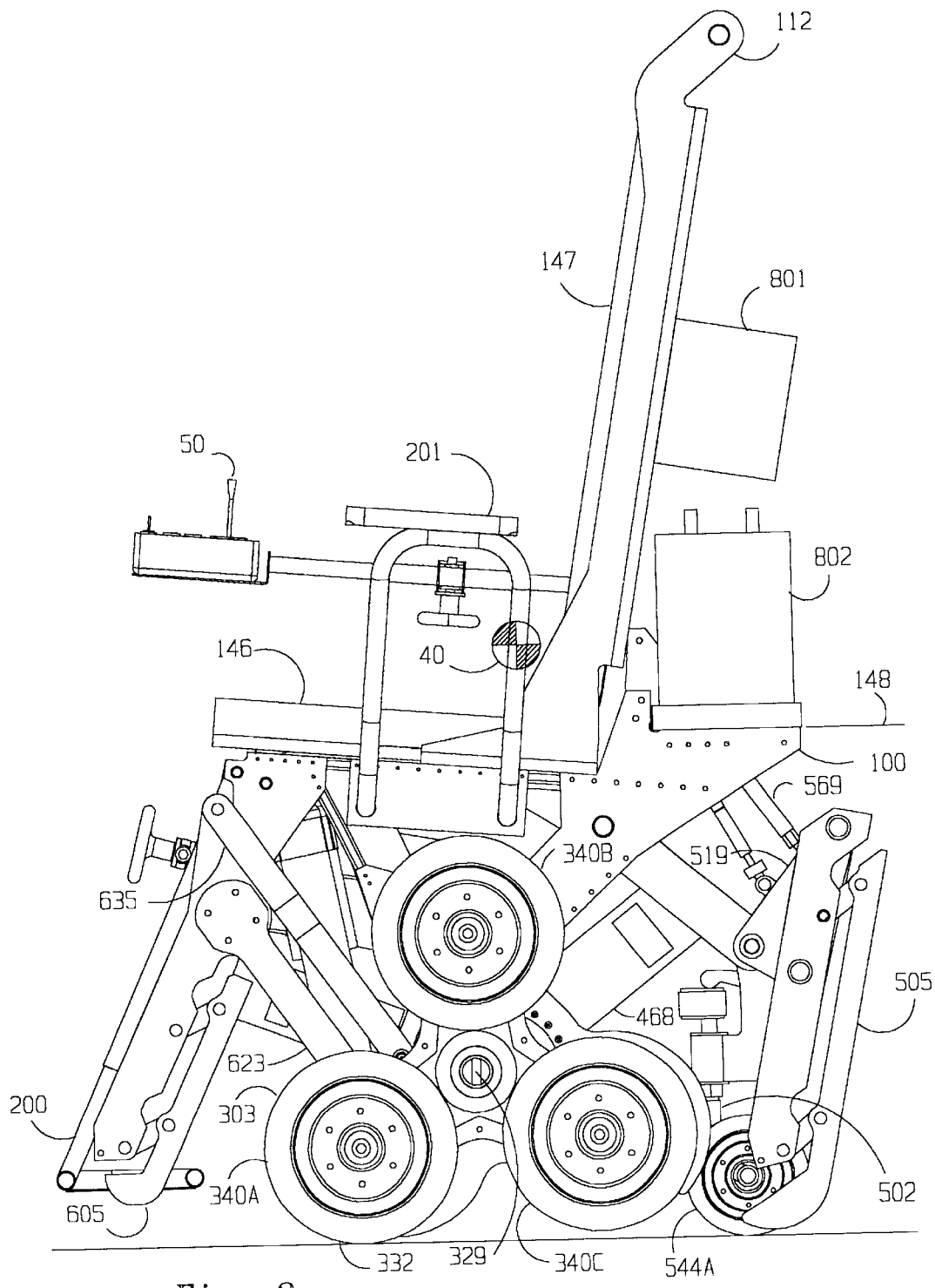
FIG. 2 is a side elevation view of the stair-climbing wheelchair as illustrated in FIG. 1.
Figure 3:
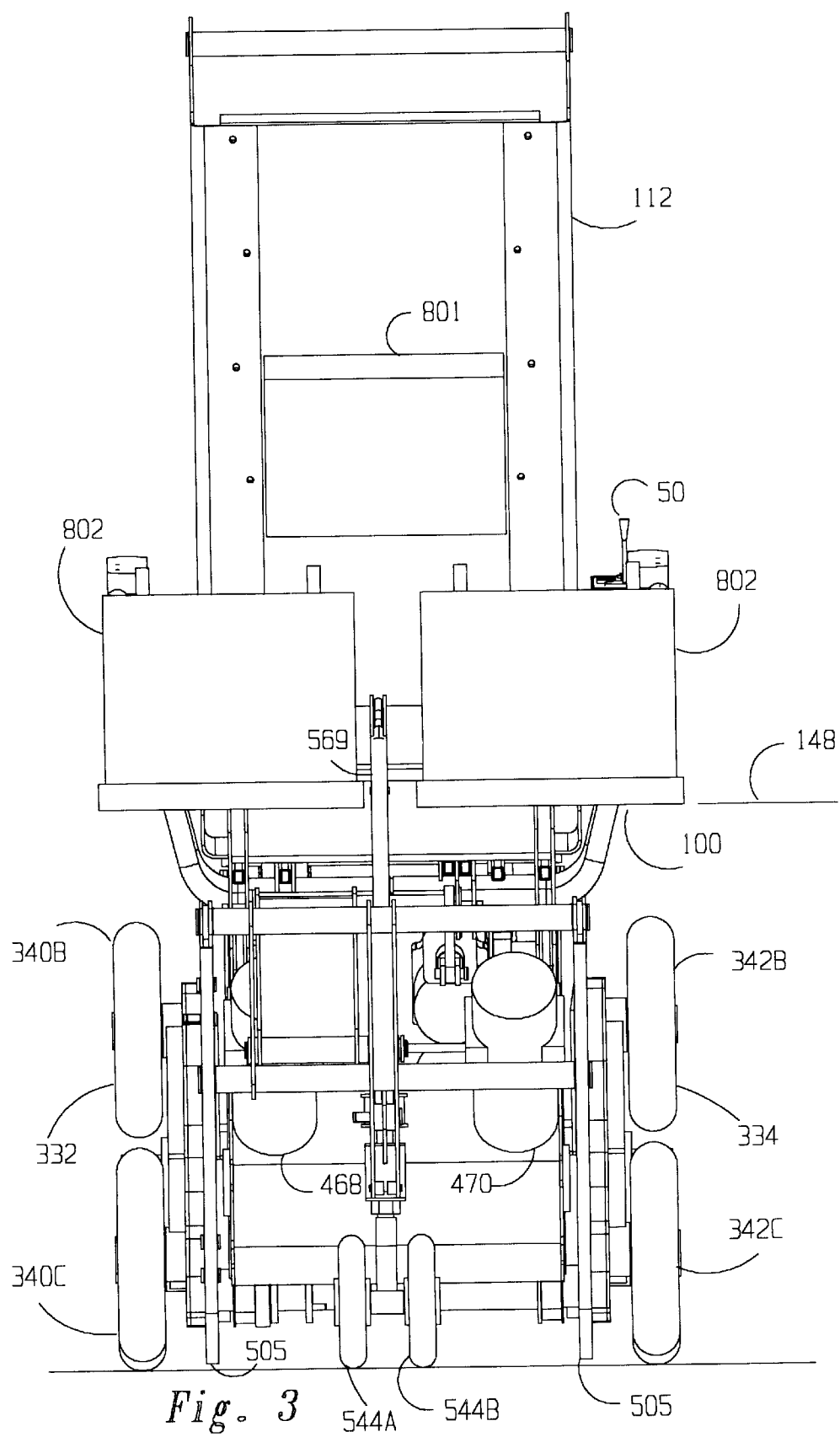
FIG. 3 is a rear elevation view of the stair-climbing wheelchair as illustrated in FIGS. 1 and 2.

Referring initially to FIGS. 1, 2, and 3; a wheelchair 112 in accordance with the present invention is shown in its preferred form-wherein a pair of parallel spider wheels 332 and 334 are mounted on opposite sides of a wheelchair frame 100. Each of the spider wheels 332 and 334 has three spider wheel spokes 330 which extend outwardly from a central, transverse spider wheel rotation axis 329, and each spider wheel has a set of three drive wheels. The individual spokes 330 of the spider wheels 332 and 334 may be designated with the suffixes A,B,C. e.g. 330A etc.

The left set of drive wheels are identified as a group by the reference numeral 340 and the right by 342. Individual drive wheels are designated by the reference numeral 340 or 342 and suffixes A, B, and C, e.g.; 340A or 342A etc. The suffixes A, B, and C refer to a drive wheel in a figure at a particular location rather than a particular drive wheel. A particular drive wheel designated as 340A might be redesignated as 340B or 340C if it was in different position after a stair climbing. In this document clockwise or counterclockwise rotating direction are as viewed from the driver's left side. Left and right refer to the driver's left and right.

Level Mode

In one of its four modes, the wheelchair 112 is adapted for conventional level traveling. In the level mode, the wheelchair 112 is supported on a total of three points. Two of which are the forward-lower drive wheels 340A and 342A. The third is a rear caster 502 with a half fork pivoting in an axis 503 defined by two bearings 533 and with a pair of caster wheels 544A and 544B. The rear caster assembly 502 also could be full fork with a single wheel. In order to ensure that only two of the drive wheels 340 and 342 are in contact with the level ground at any one time, the two spider wheels 332 and 334 are rotated about spider rotation axis 329 counterclockwise by an angle of 2-degrees. The lower rear drive wheels 340C and 342C are lifted off the floor 776 and held there. The mechanism for accomplishing this lifting is described in greater detail later. The rotation of the spider wheels 332 and 334 is most readily apparent in FIG. 2.

Placing only three points, rather than five points, in contact with a level supporting surface, improves the mobility of wheelchair 112 by reducing the wheel-to-ground friction which resists turning. This resisting friction might be understood by examining the turning of a rotary lawn mower with four non-castering wheels. It is easier to turn the mower if it is tilted back to lift the front wheels rather than to turn it with all four wheels resting firmly on the ground. Indeed, enhanced mobility for the wheelchair 112 in its travel mode is one of its distinguishing characteristics. Certain dimensional choices will be described later that will make this even more apparent.

An arrangement with two forward fixed axle wheels and a rear caster is recognized as naturally unstable for manual steering. In order to provide steering stability for our arrangement, DC electric propulsion motors 468 and 470 are provided with speed control feedback in the control system 801. Prior electric wheelchairs with front-wheel drives have exhibited good steering stability.

Slope Mode

In another of its four modes, the wheelchair 112 is adapted for steep slope mode traveling. In the slope mode, the wheelchair 112 is supported on a total of four points, the two lower drive wheels on each sides, 340A, 340C, 342A, and 342C. During travel the front skids 605, rear skids 505, and rear caster 502 are maintained close to the ground but do not provide support. When the wheelchair 112 has stopped in the slope mode (MSL), the balancing devices 650 provide additional support to accommodate the driver leaning forward or backward. The spider wheels 332 and 334 are rotated as required to hold the wheelchair 112 at a plus or minus 2 degree attitude in the slope mode. This provides comfort for the driver and maintains the center of gravity 40 fore and aft (forward or backward) position between the front 340A and rear 340C drive wheels to ensure stability. The slope mode will be described in more detail later.

Recline Mode

In another of its four modes, the wheelchair 112 is adapted for reclining. While in motion to recline, the wheelchair 112 is supported on a total of three points, the two forward lower drive wheels on both sides 340A and 342A and the rear caster 502. During reclining motion the front skids 605 are maintained close to the ground but do not provide support. When the wheelchair recline motion has stopped, the balancing devices 650 provide additional support to accommodate the driver leaning forward or backward. To recline, the spider wheels 332 and 334 are rotated counter clockwise to lift up the front of the wheelchair 112 and the caster 502 is raised relative to the wheelchair frame 100 to lower the rear of the wheelchair 112. The recline mode will be described in more detail later.

FIGS. 1, 2, 3—Chair Description Continued

Continuing with FIGS. 1, 2, and 3; the wheelchair frame 100 includes a seat 146 and seat back 147 for the driver. Armrest 201 and leg rest 200 are also attached for the comfort and convenience of the driver. For discussion purposes, a horizontal-reference plane 148 is defined as a horizontal plane passing through the bottom of the battery 802. Both the bottom of the battery 802 and the plane 148 are designed to be parallel to the ground when the wheelchair 112 is configured for level travel. The pitch of the plane 148 relative to the Earth level is utilized to control stair climbing operations of the wheelchair 112. During stair negotiations, wheelchair inclinations are critical for the comfort of the driver and are an indication of the fore and aft position of the center of gravity 40. The method for measuring the pitch of the plane 148 will be described later. The expressions "nose up" and "nose down" will often be used herein to help explain the inclination or attitude of the wheelchair 112 at a given time. See FIG. 2.

The wheelchair frame 100 also includes mounting for a spider-assembly-driving electrical motor 469, as well as front skids actuator 621 and caster actuator 521. The function of the front skids actuator 621 is to extend and retract the front skids 605. The function of the caster actuator 521 is to extend and retract the rear skids 505 and rear caster 502. The front skids 605, rear skids 505, and rear caster 502 are utilized during the stair-climbing, slope-climbing and reclining modes of operation. The front skids 605, rear skids 505, and rear caster 502 are used to provide a front and rear pitch-attitude-adjustment method for changing the pitch attitude of the frame with respect to a level surface. At certain times the rotation of spider wheels 332 and 334 will also provide the powered-pitch-adjustment. The rear caster 502 is raised and lowered together with the rear skids 505.

FIGS. 4,5,7,8—Wheelchair Size and Support

Figure 4:
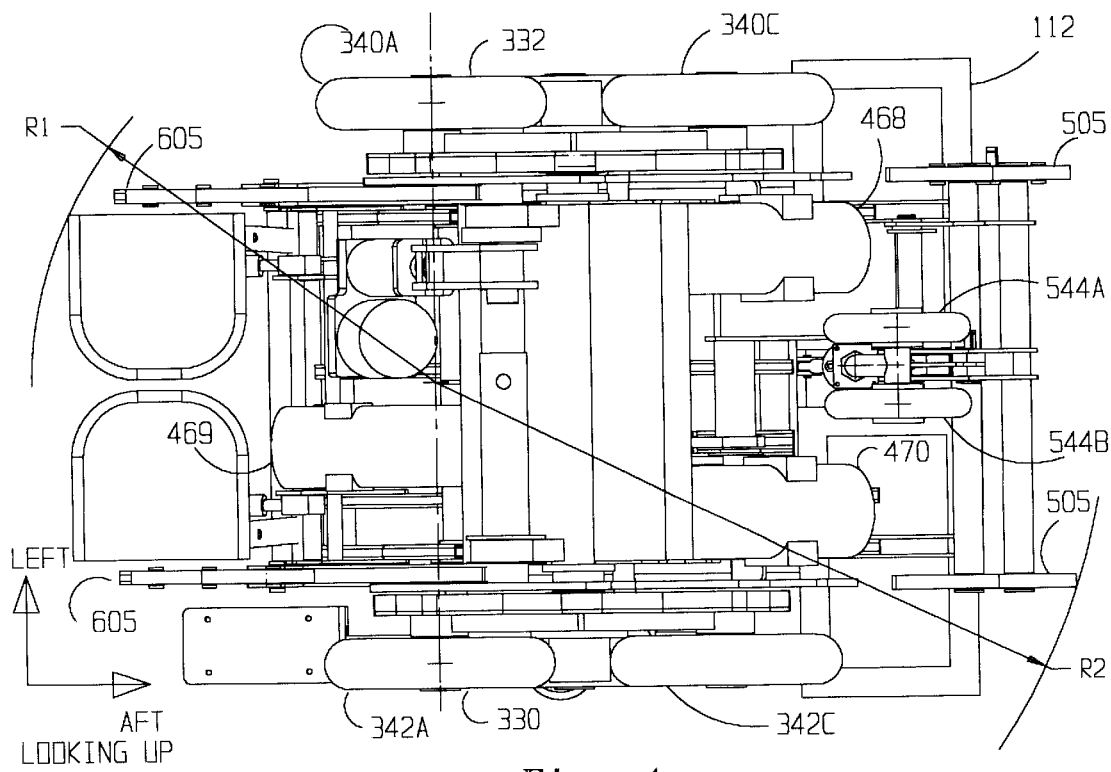
FIG. 4 is a bottom plan view of the stair-climbing wheelchair as shown in its level-travel mode.
Figure 5:
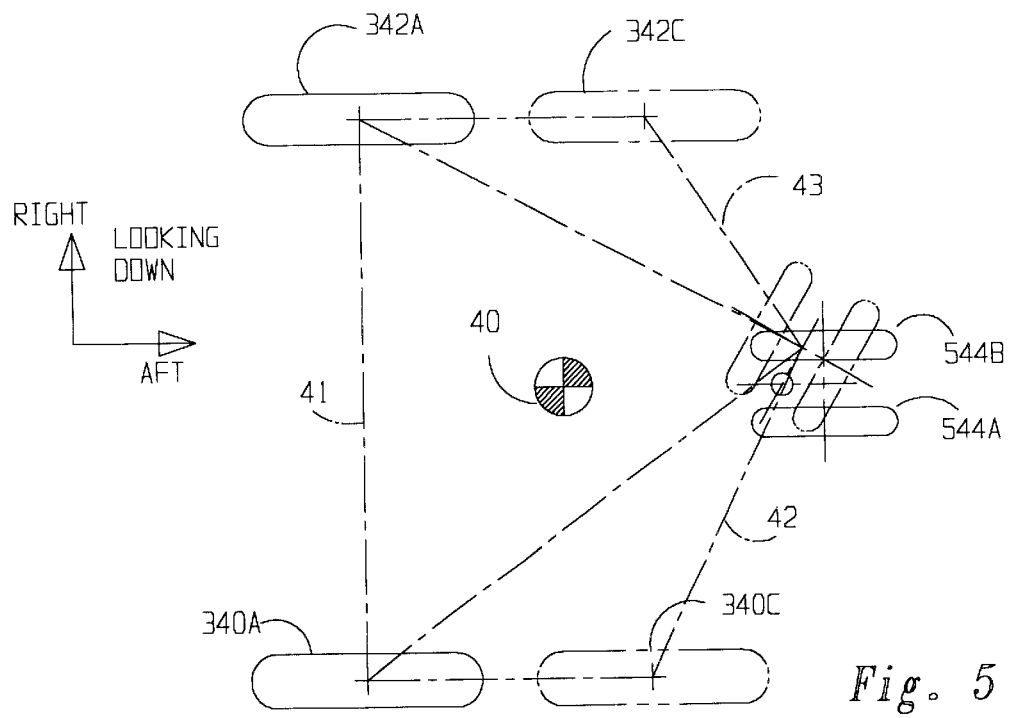
FIG. 5 is a diagrammatic illustration of the load-supporting wheels that are routinely in contact with the ground during level travel.

Turning next to FIGS. 4 and 5, the relative position of the supporting drive wheels 340A and 342A and caster wheels 544A and 544B form a very compact pattern. The overall outside width of the drive wheels 340A and 342A is 53.3-centimeters (21-inches). The wheelchair 112 was configured to make the overall width small in order to permit access of the wheelchair 112 through narrow doors such as residential bathrooms.

Another significant measurement is the sum of the front clearance turn radius R1 and rear clearance turn radius R2 as measured in the bottom view (FIG. 4) from the center of the centerline between the two forward supporting drive wheels 340A and 342A. The wheelchair 112 was configured to make the R1 plus R2 sum small to enable the wheelchair 112 to make turns in a narrow hallway or at the bottom or top of a flight of stairs. This sum is preferably less than 88.9-centimeters (35-inches) so that a 180-degree turn can be made in a 91.4-centimeter (36-inch) hallway or a 90-degree turn can be made on 91.4-centimeter (36-inch) square stair landing. See FIGS. 7 and 8.

Stairways in homes with a straight entrance, a straight exit, and no turn in the middle are rare. For this reason this wheelchair 112 has been designed to minimize its width and length so that it will be practical for traveling into many more locations. On the other hand, it is important that the stability of the wheelchair 112 driver be maintained, so the rear caster 502 cannot be located too close to the front supporting drive wheels 340A and 342A and the outside width of the drive wheels 340A and 342A be as wide as possible.

FIG. 5, which is a top-plan view of the supporting wheels (wheelchair 112 components omitted for clarity), shows the relative position of the three support points: the drive wheels 340A and 342A plus the caster wheels 544A and 544B. In addition, a triangle 41 has been drawn in this figure for the sole purpose of demonstrating the support "area". A combined driver and wheelchair center of gravity 40 above and inside this support "area" will be supported by drive wheels 340A, 342A and caster wheels 544A and 544B. Two additional triangles 42 and 43 have been drawn to show additional support "area" provided by drive wheels 340C and 342C. The additional support provided by the drive wheels 340C and 342C permit the wheelchair to accommodate cross slopes of up to 20 degrees.

Figure 6:
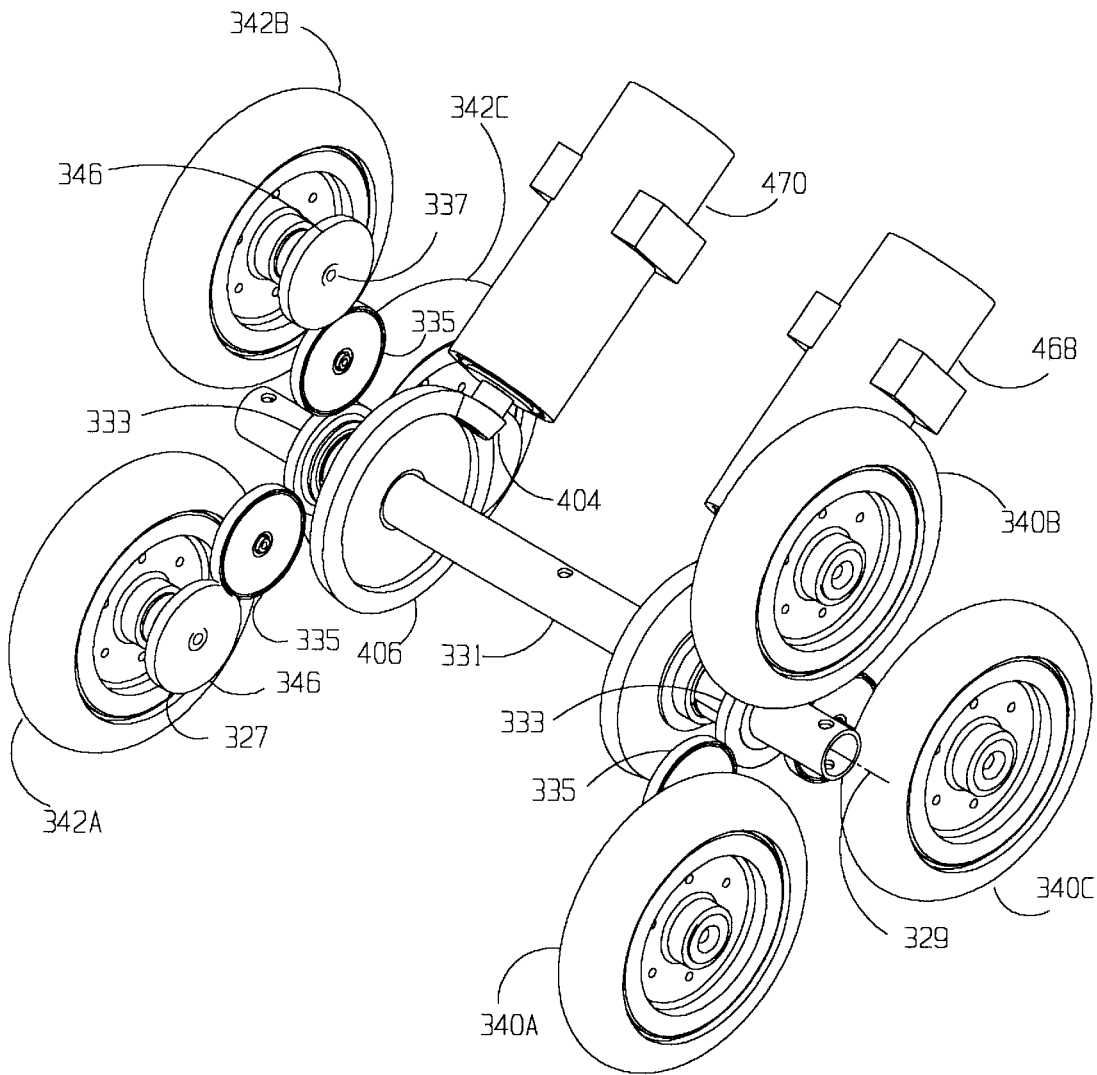
FIG. 6 is a fragmentary isometric view of the propulsion motors and associated gearing that are employed to drive the wheelchair.
Figure 10:
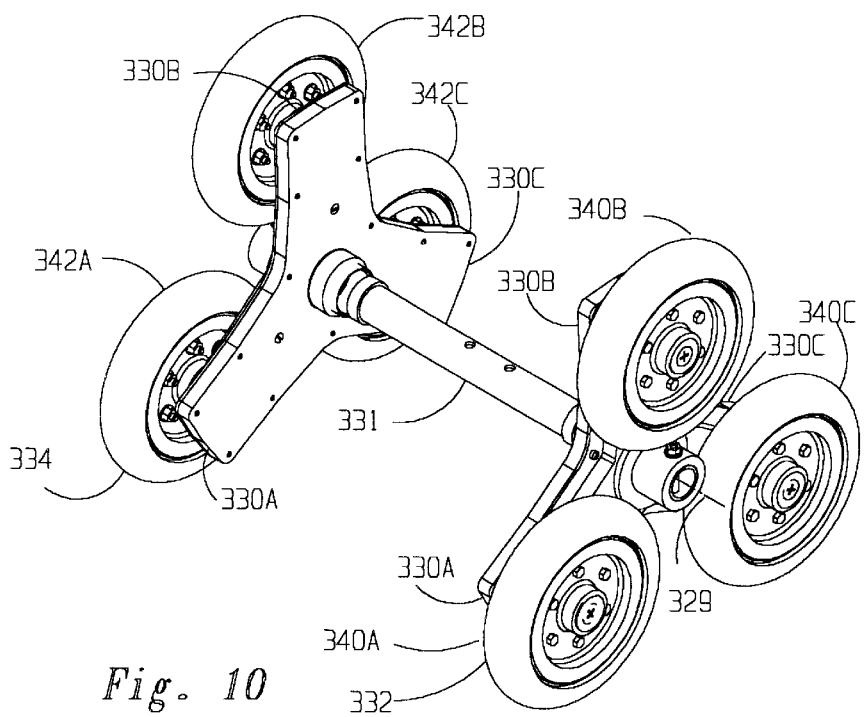
FIG. 10 is an isometric view of left and right spider wheels with a connecting axle.
Figure 13:
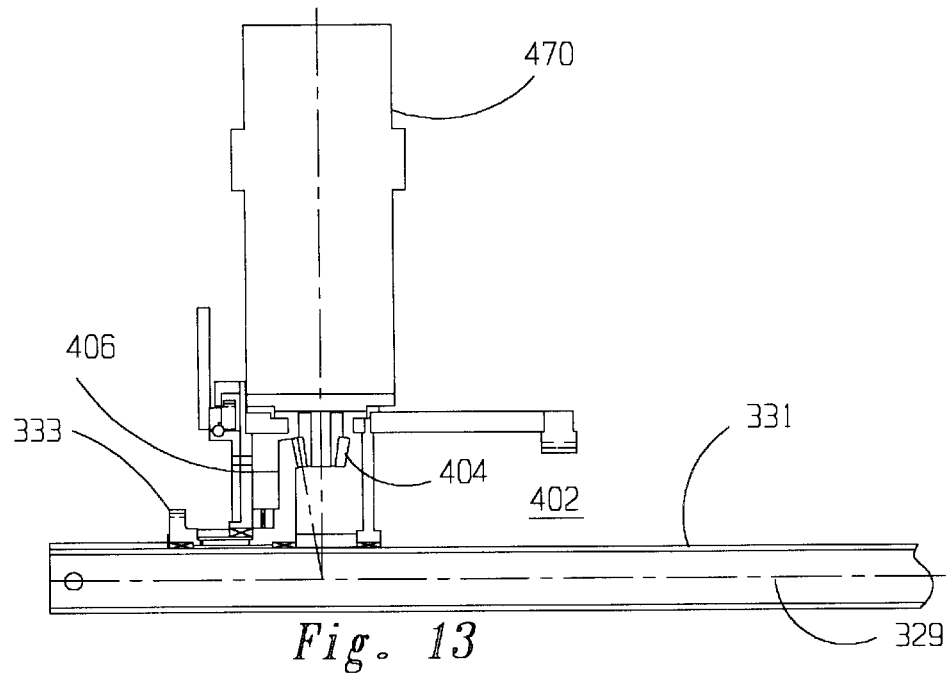
FIG. 13 is a cross-sectional view of the propulsion drive system taken through a radial portion of FIG. 9.

FIGS. 6,10,13—Drive Wheel Propulsion System

The spider wheels 332 and 334 engage the stairs to propel and assist stabilizing the wheelchair 112 during climbing and descending stairs. A large percentage of the weight is carried by the spider wheels 332 and 334 to facilitate climbing. Propulsion and transition control power are provided by individual DC electric motors and gear drive systems. See FIG. 6.

Propulsion power for both conventional level operation and stair-climbing operation is supplied by the same DC propulsion motors 468 and 470 and transmitted through the same spider wheels 332 and 334 and drive wheels 340 and 342. Spring-actuated and current released brakes on the propulsion motors 468 and 470 are used to lock the wheelchair 112 in place when it is stopped. Note this type of brake is well known and commonly available. This type of brake is used on other motors in the wheelchair 112 where friction alone does not prevent them from turning.

The left and right drive wheel sets 340 and 342 are driven by separate mirror image systems. See FIGS. 6, 10, and 13.

The right hand propulsion drive 402 consists of propulsion motor 470, with pinion 404 attached to its shaft and engaging miter gear 406. Miter gear 406 rotates about axis 329 and is indexed to central gear 333. Central gears 333 rotate the drive wheels 340 and 342 in an advancing or backing direction using gear systems that are located within the spider wheels 332 and 334 as will be described later. In addition to brakes, conventional optical encoders are also present on the motors 468 and 470 to provide motor rotation feedback to the control system 801.

Figure 14:
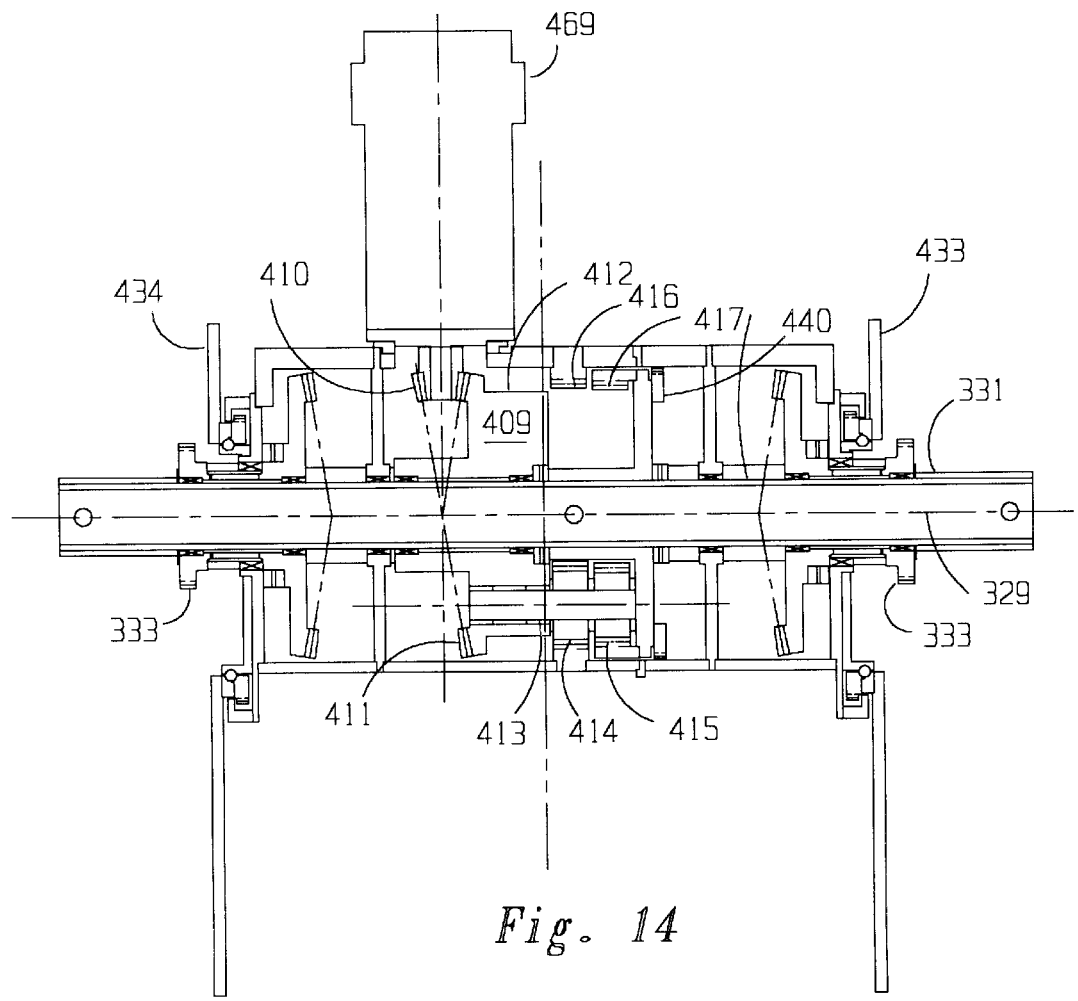
FIG. 14 is a cross-sectional view taken through a radial portion of FIG. 9 illustrating the spider wheel drive.
Figure 19:
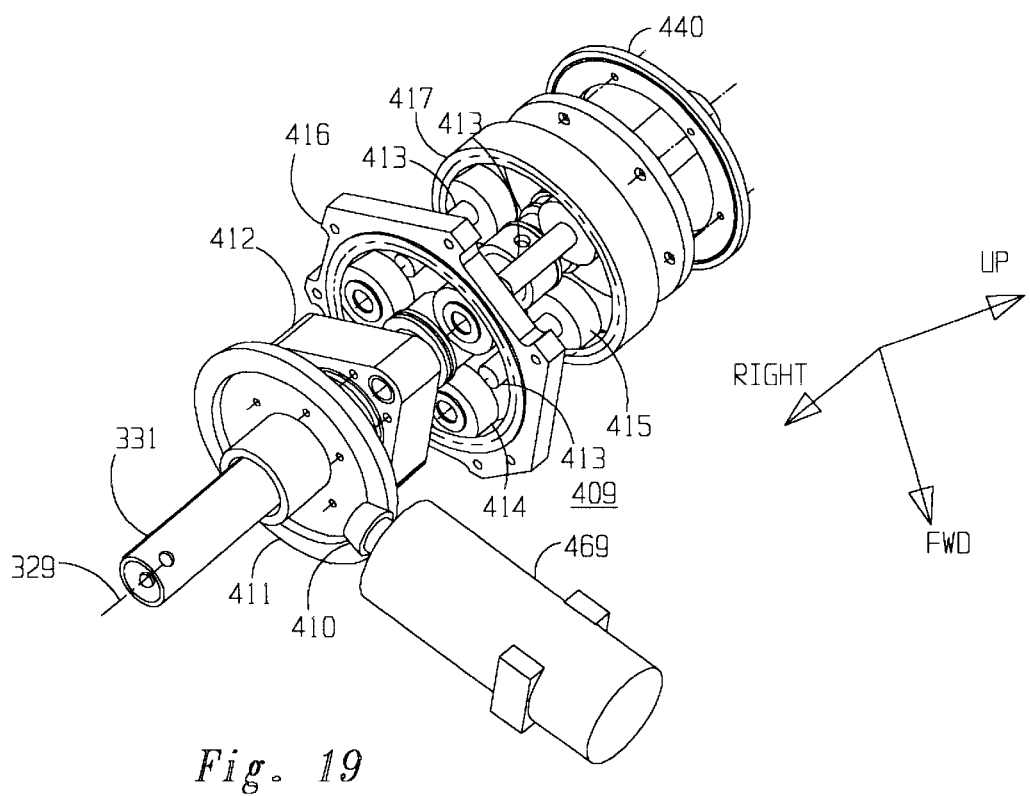
FIG. 19 is an exploded isometric view of the spider wheel shaft drive system.

FIGS. 14, 19—Spider Wheel Rotation System

The spider wheel shaft 331 that connects and rotates the two spider wheels 332 and 334 is driven by spider wheel motor 469 with a planetary gear system 409. See FIGS. 14 and 19. Pinion 410 is attached to the shaft of motor 469 and engages miter gear 411. Miter gear 411 rotates about axis 329 and is a part of the planetary carrier 412. The planetary carrier 412 rotably supports three planetary shafts 413 located at 120° intervals around the axis 329. Each of the planetary shafts 413 has two planet gears 414 and 415 rigidly attached. The first planet gear 414 on shaft 113 engages a fixed internal gear 416. The second planet gear 415 on the planetary shaft 413 engages an internal gear 417 that is rigidly connected to the shaft 331. A small difference in the number of teeth in the two internal gears 416 and 417 and the planet gears 414 and 415 provide a large speed reduction in rotational speed and large increase in torque at the shaft 331. A planetary gear system of this type is well known and common. DC electric motor 469 is equipped with a spring-actuated and electrically released brake. The spring-actuated brake indexes the spider wheels 332 and 334 at all required positions including the 2-degree position referred to earlier for the level mode. An optical encoder is also present on motor 469 to provide motor speed and rotation angle feedback to the control system 801.

Figure 11:
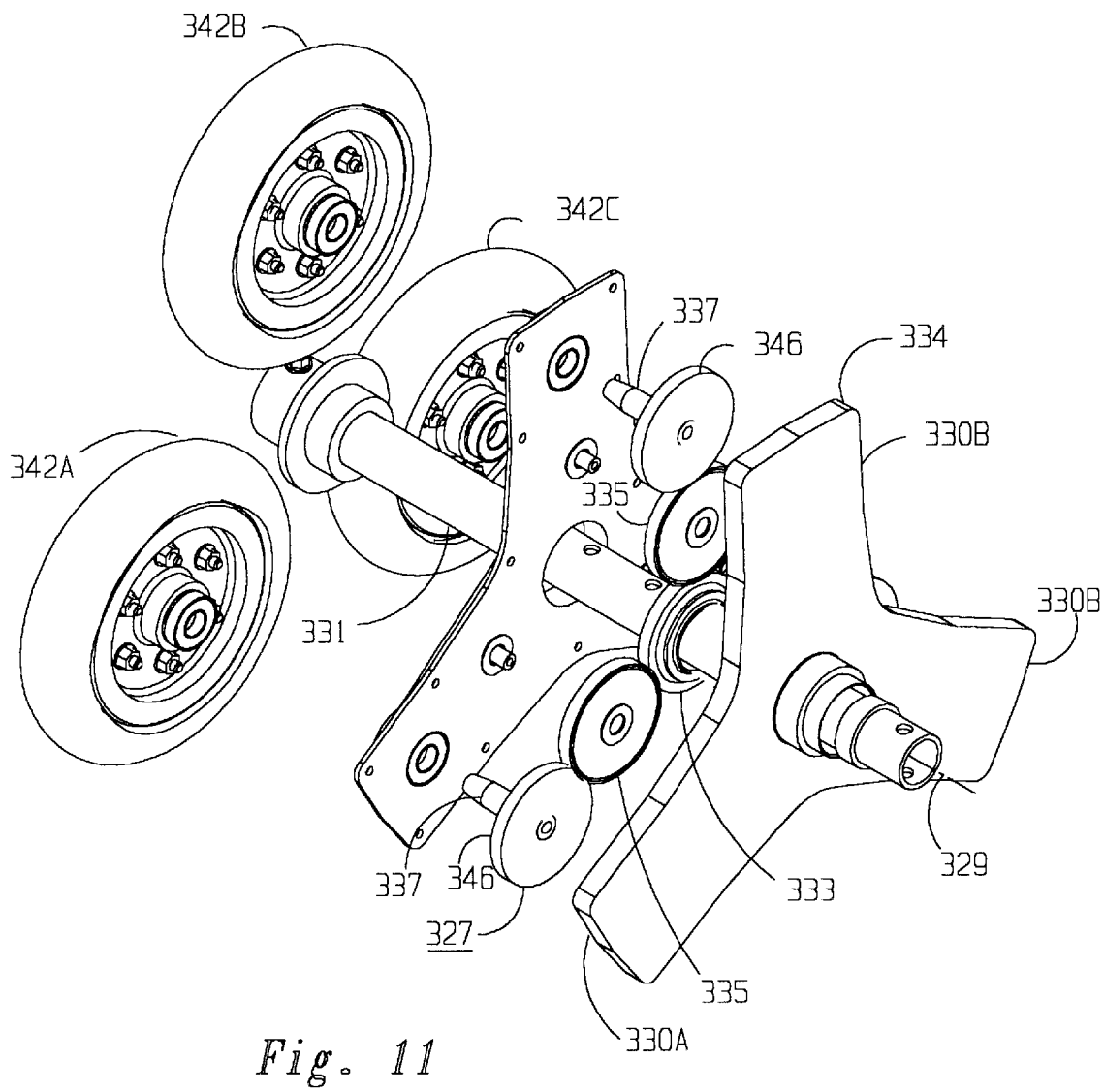
FIG. 11 is an exploded isometric view of the spider wheel.
Figure 12:
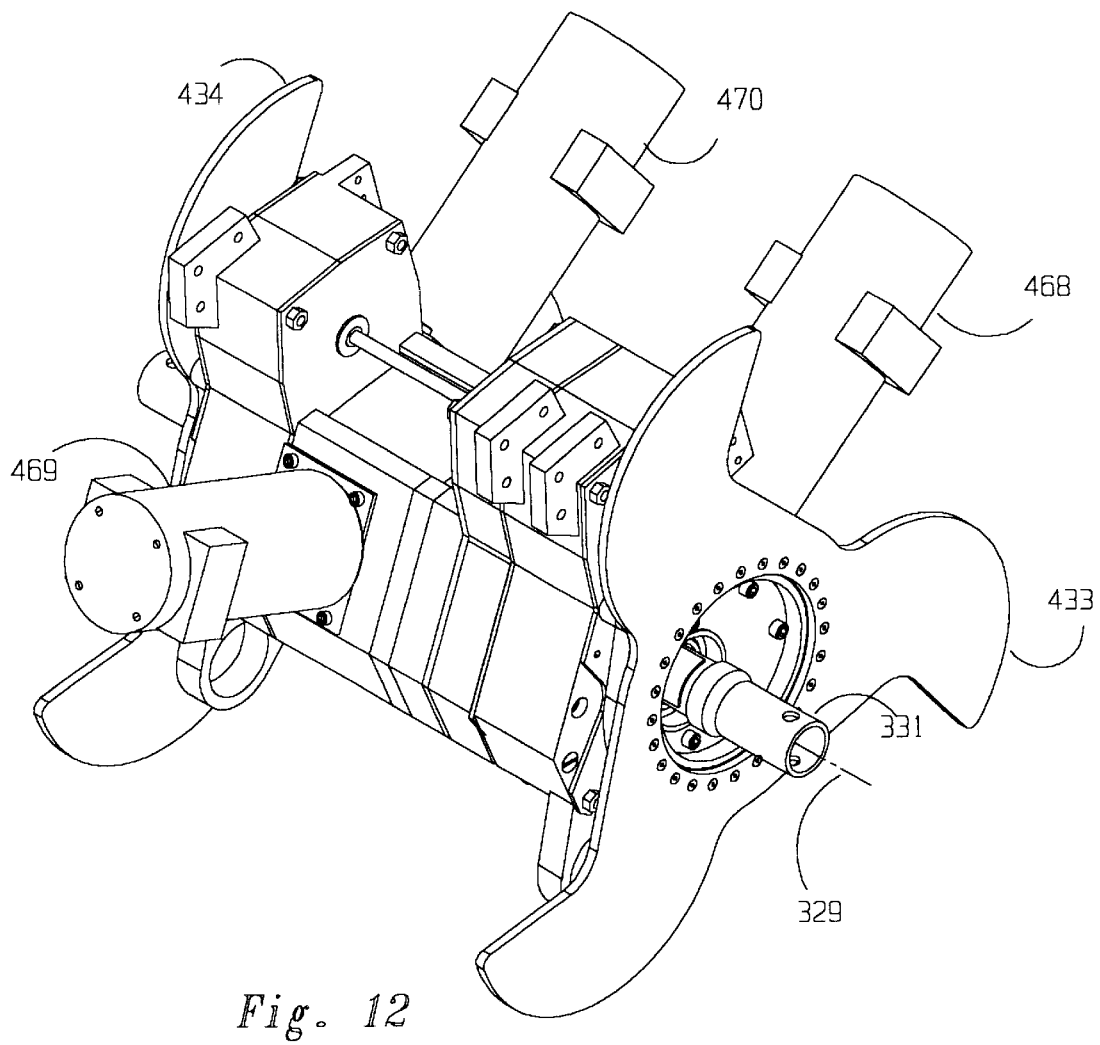
FIG. 12 is an isometric view of a propulsion and spider wheel drive gearbox.

FIGS. 10, 11—Spider Wheels

Each spider wheel 332 and 334 has an individual drive wheel 340 or 342 rotably attached to each of its three individual spokes 330A, 330B, or 330C. See FIG. 10.

Examining the right spider wheel 334 in FIG. 11, each drive wheel 342 is sequenced to rotate in unison by a drive wheel gear system 327. A central gear 333 is mounted on shaft 331 and is free to rotate about the axis 329 as driven by miter gear 406. Three idler gears 335 engage the central gear 333 and three pinion gears 346. Each pinion gear 346 is rigidly attached to a drive wheel shaft 337 for each of the drive wheels 342. This sequences each of the drive wheels 342 to rotate in the same direction as the central gear 333. The left spider wheel 332 is a mirror image of the right spider wheel 334 and is driven in the same manner by a similar but separate system.

FIGS. 15, 16, 17, 20—Caster and Rear Skids

Figure 15:
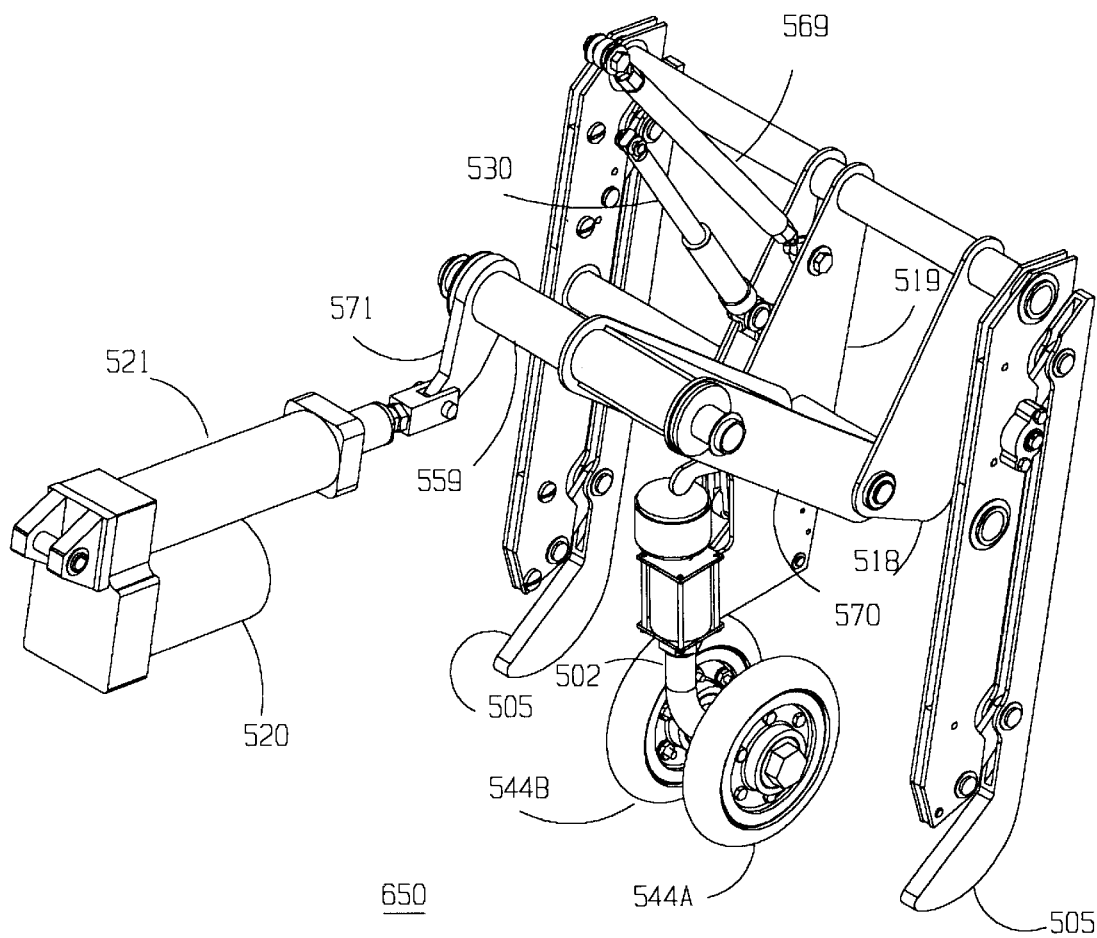
FIG. 15 is an isometric drawing of rear skids and caster-retract mechanism for the stair-climbing wheelchair.
Figure 16:
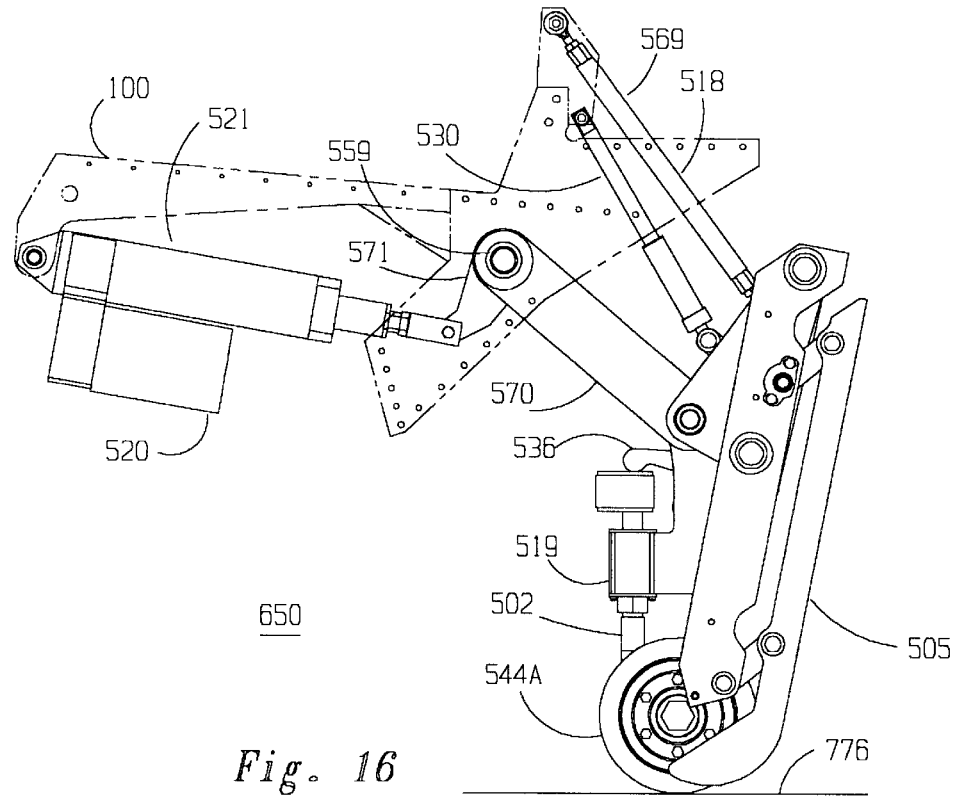
FIG. 16 is a side elevation view of the rear skids and caster-retract mechanism in its extended position.

Referring next to FIGS. 15 and 16, the same rear caster 502 that is essential for stability when the wheelchair 112 is on level ground becomes a hindrance to travel when the wheelchair 112 is traversing stairs. Therefore, it must be moved to a non-interfering position during stair travel. The rear caster 502 is moved inward and upward so that the wheelchair 112 can be close to the ascending stairs while the rear caster 502 is being raised. This enables the wheelchair 112 to begin stair climbing from a minimal size stair landing and to remain stable during the transitioning from level travel to stair climbing. See FIGS. 20A and 20B.

Figure 17:
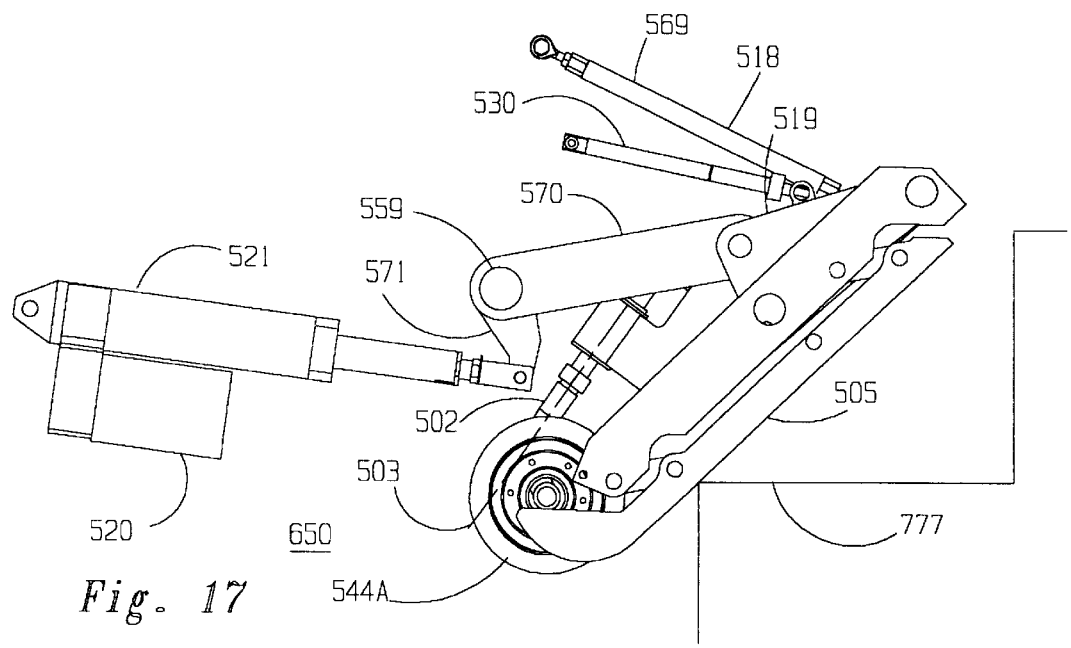
FIG. 17 is a side elevation view of the rear skids and caster-retract mechanism in its raised or retracted position.

The rear caster 502 is retracted for stair climbing as shown in FIGS. 20B and 17. The rear caster 502 is suspended by a caster four bar linkage 518. The linkage 518 consists of:

(1) an arm 570 rotably attached to frame 100, (2) a link 569, (3) a caster hanger 519, and (4) the frame 100.

The cross shaft 559 is rigidly attached to arm 570 and is used to rotably attach the arm 570 to frame 100. The link 569, is rotably connected to the frame 100 and the caster hanger 519. The caster hanger 519 is rotably attached to the arm 570 and the link 569. The rear caster 502 is rotably mounted to the caster hanger 519. The linkage 518 raises the caster 502 to provide clearance for stair climbing. The linkage 518 is configured to move the rear caster 502 forward as it raises it to enable the rear caster 502 to be utilized when the wheelchair 112 is adjacent to the stairs on a small stair landing. The caster actuator 521 is rotably attached to the frame 100 and to an actuation arm 571 on the cross shaft 559. The arm 571 is rotated by caster actuator 521 to operate the linkage 518. Retraction and deployment of the rear caster 502 is controlled by the control system 801. The caster actuator 521 is driven by caster motor 520. The motor 520 is a DC electric motor and is equipped with a conventional spring-actuated and electrically released brake. A conventional encoder is also present on motor 520 to provide speed and position feedback to the control system 801.

Figure 22:
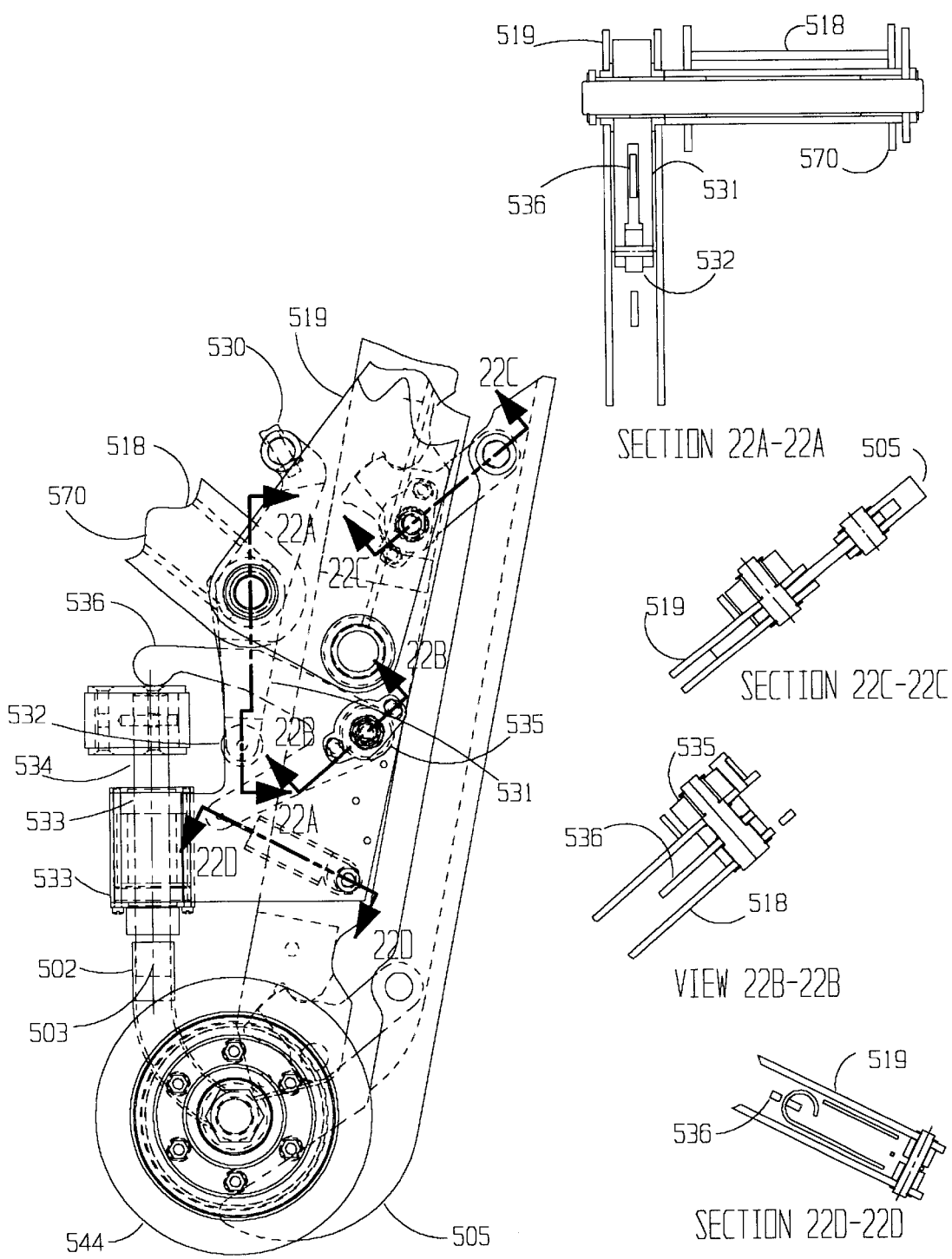
FIG. 22 is a side view of the rear caster and skids with section view FIGS. 22A—22A, 22B—22B, 22C—22C, and 22D—22D which show the rear skids with sensors for determining the nearness of the skids and rear caster to the stairs and floor.

FIGS. 17, 22—Caster Swivel for Retraction

The rear caster 502 is able to swivel while it is supporting the rear of the wheelchair 112 to permit steering. When it is not supporting the rear of wheelchair 112 and the rear caster 502 is lifted off the floor 776, the caster pivot axis 503 is tilted as shown in FIG. 17. Since the weight of the caster wheels 544A and 544B are offset from the axis 503 and the axis 503 is tilted, the rear caster 502 tends to swing to the aft trailing position. Swinging the rear caster 502 to the aft position is necessary so that space constraints will not prevent the rear caster 502 and skids 505 from reaching their full up position. In the caster wheel forward/upper position, the caster wheels 544A and 544B would contact other wheelchair 112 components and prevent movement of the rear caster 502 and rear skids 505 to the full up position that is necessary for climbing the steeper stairs. A spring loaded link 530 operates a centering arm 531 with an attached roller 532 to further ensure centering when the linkage 518 lifts the caster. See FIG. 22.

Figure 20:
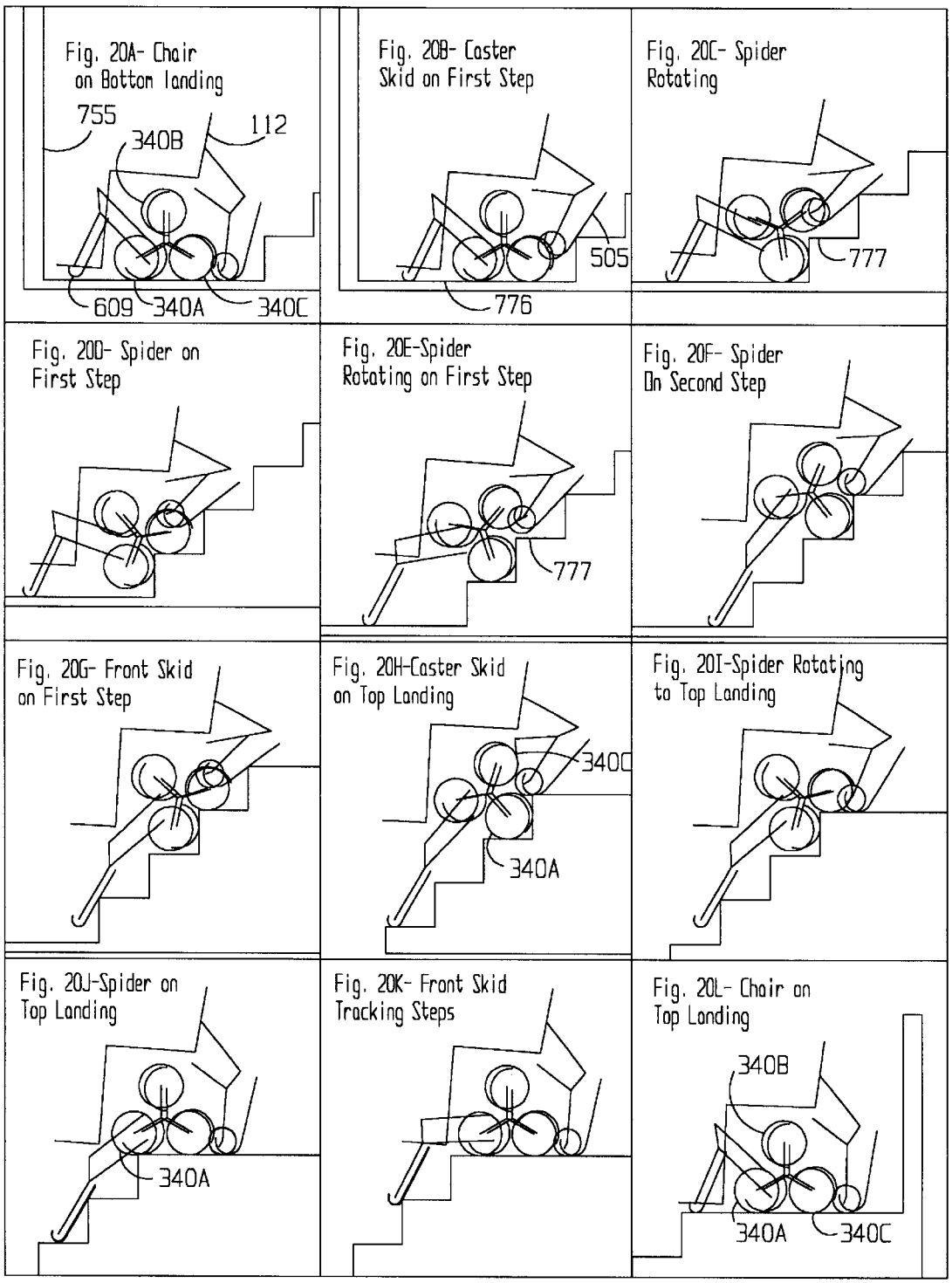
FIGS. 20A through 20L depict a series of the wheelchair positions as it negotiates stairs.
Figure 23:
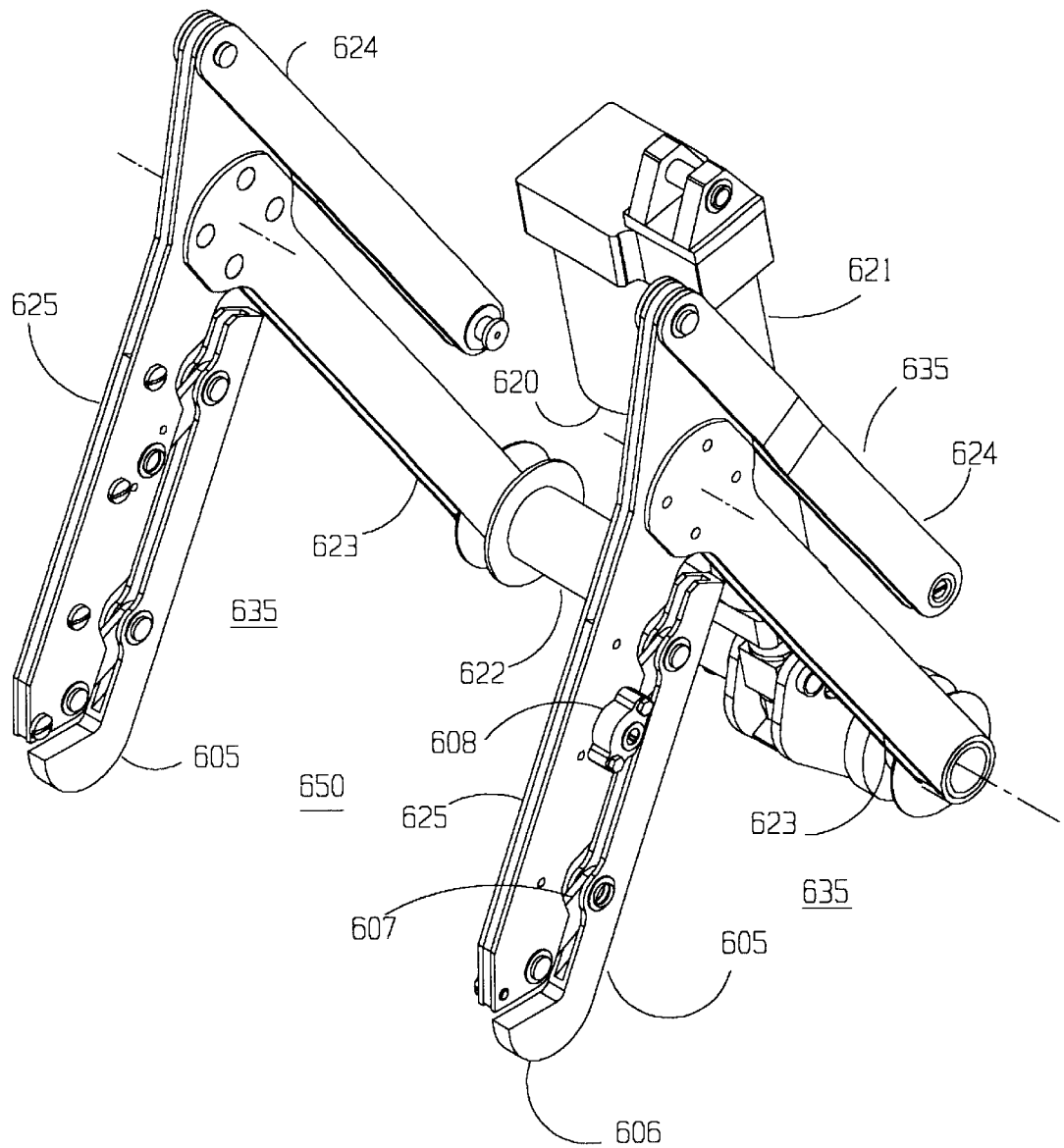
FIG. 23 is an isometric drawing of a front skid actuation mechanism with the frame and much of the adjacent hardware being omitted for clarity.
Figure 24:
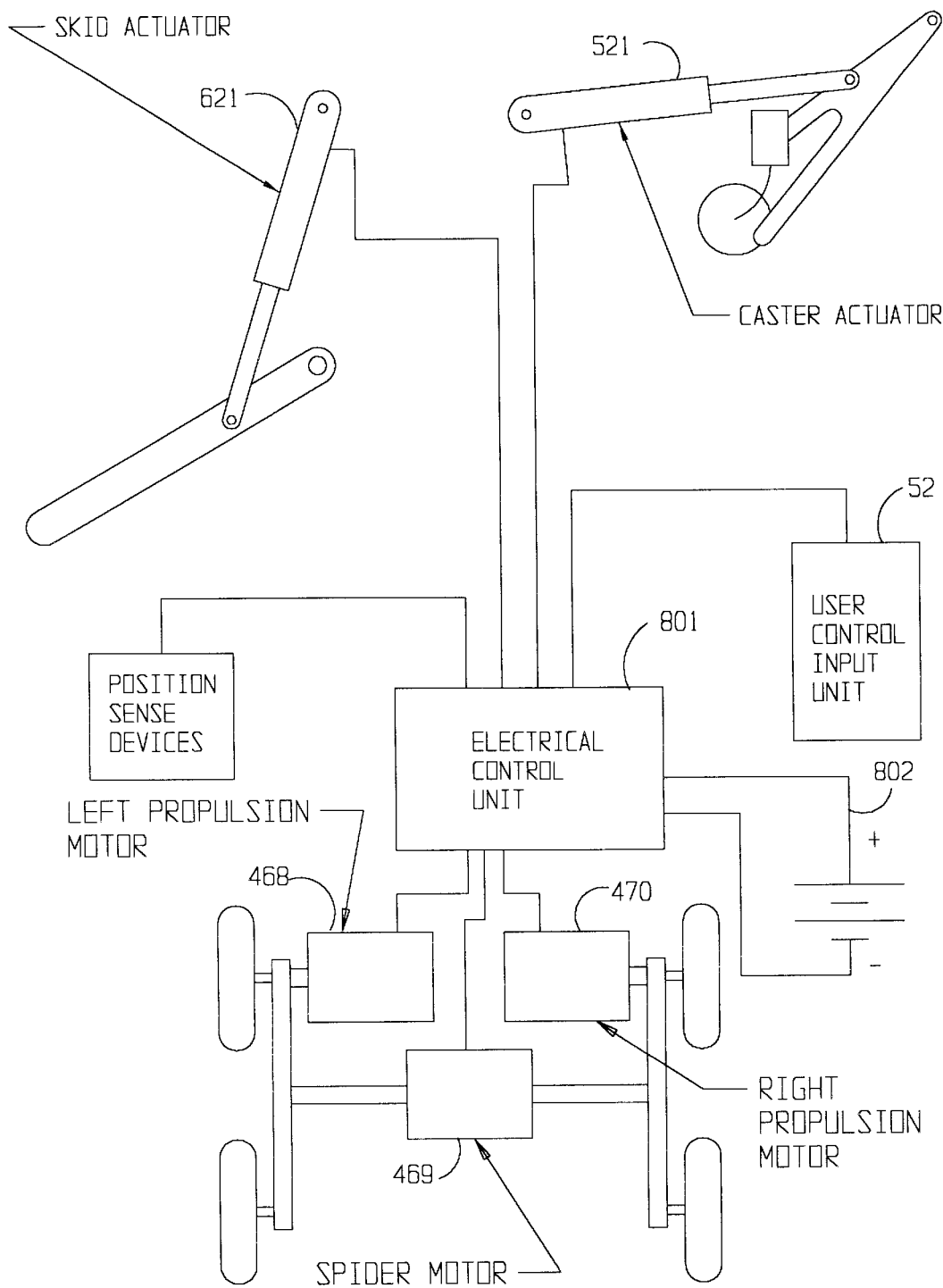
FIG. 24 is a block diagram of an electrical control system for the stair-climbing wheelchair.

FIGS. 23, 20—Front Skids

The front skids 605 which are used for stair climbing are retracted for level operation. See FIG. 23. The front skids 605 are continually adjusted to a series of positions during stair climbing. See FIG. 20. The position of the front skids 605 is maintained by a front skids actuator 621.

The front skids 605 include a skid linkage 635 located on either side of the wheelchair 112. See FIG. 23. Each skid linkage 635 is a four bar linkage consisting of:

(5) a skid arm 623 which is rotably attached to the wheelchair frame 100, (6) a skid support link 625 which is rotably attached to the skid arm 623, (7) a skid link 624 which is rotably attached to link 625, and (8) wheelchair frame 100.

The skid arms 623 of each skid linkage 635 are rigidly attached to a front skids torque tube 622 and force the two skid linkages 635 to move together. The front skids actuator 621 rotates the torque tube 622 to position the front skids 605. The skid linkages 635 raise and lower the skid support links 625 while maintaining them parallel to their original position.

FIGS. 24,30A–C,31A–B—Control System

An electronic control system 801 controls all powered wheelchair 112 operations. See FIG. 24. The control system 801 routes power to electrically operated devices on the wheelchair 112 as determined by driver inputs, electronic sensor inputs, and control system logic. The control system 801 provides a control method for powering the pitch-attitude-adjustment devices, in response to signals generated by the electronic pendulum. Electronic circuitry including solid-state motor speed controls and control logic are located in the control system 801 at the rear of the wheelchair 112. The control logic is used differently depending on the mode of operation. Control logic flow charts for the activation of level, stair, slope, and recline modes are provided in FIGS. 30A though 30E. Equations for stair negotiation are shown in FIGS. 31A and 31B. Power is provided to the control system 801 by DC batteries 802. The DC batteries 802 are located behind the seat back 147.

Figure 25:
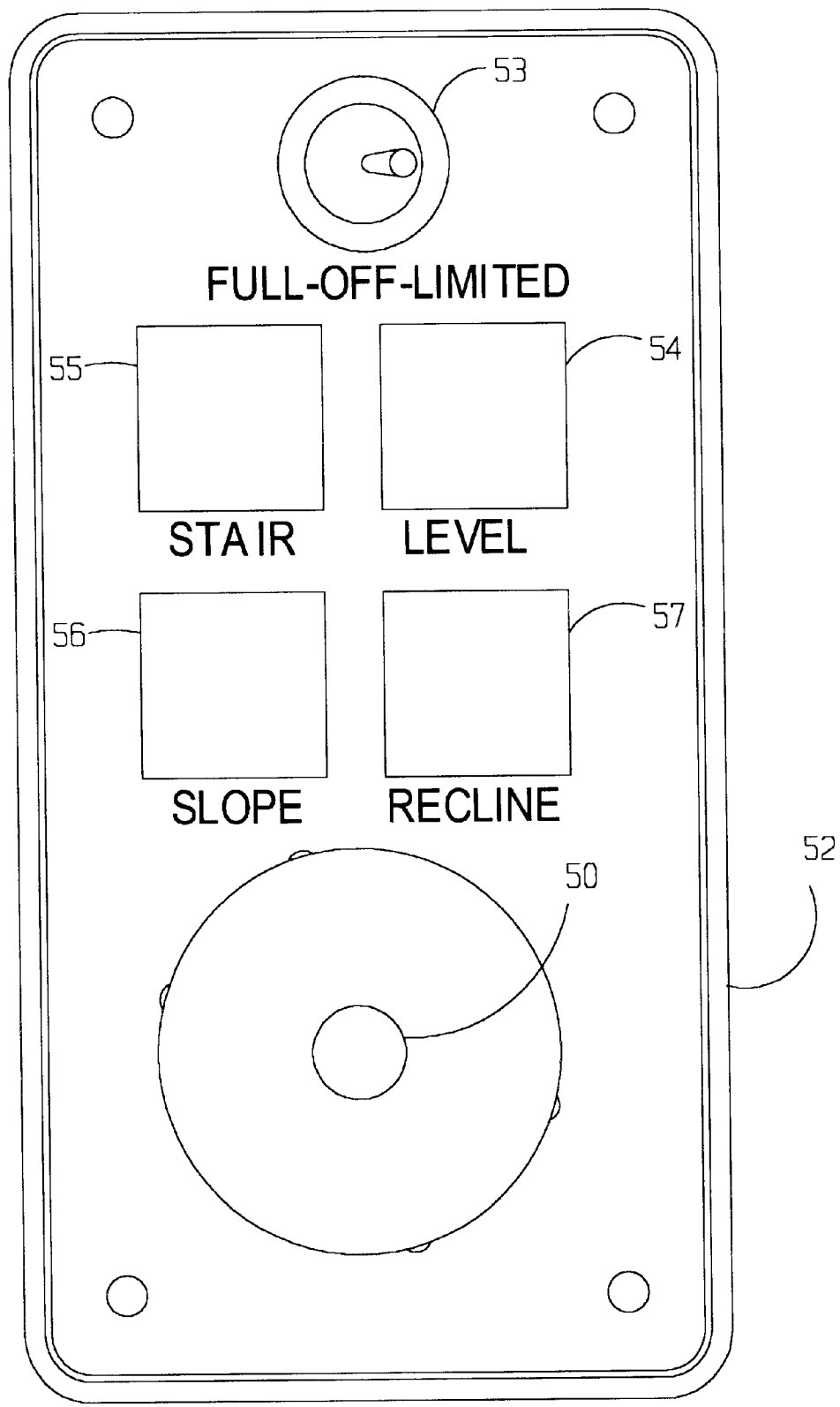
FIG. 25 is a top plan view of a control input unit, which is mounted at an advantageous spot for access by a wheelchair driver.

FIGS. 1, 25—Control Panel

A control panel 52 is shown on the right armrest 201, but is locatable on either side for the convenience of the driver. See FIGS. 1 and 25. The driver operates devices on the control panel 52 to send his or her request to the control system 801.

Referring to FIG. 25, the control panel 52 includes a full/off/limited speed range switch 53, a level mode request switch 54, a stair mode request switch 55, a slope mode request switch 56, a recline mode switch 57, and a dual axis potentiometer type joystick 50. The full/off/limited speed range switch 53 is a single pole double-throw toggle switch. The four operational mode request switches 54, 55, 56, and 57 are momentary-on switches with interior lights. The control system 801 illuminates the interior light of the switch 54, 55, 56, or 57 of the mode that is currently active.

The dual axis potentiometer joystick 50 is similar to those used on conventional powered wheelchairs with solid-state proportional speed controls. The joystick 50 performs two functions. First, the joystick 50 controls the speed and direction of the propulsion motors 486 and 470. Secondly, the joystick 50 permits the control system 801 to operate the balancing devices 650. The balancing devices 650 include the front skids 605, rear skids 505, and rear caster 502. The balancing devices 650 are operated if required by the control system logic but only when the joystick 50 is deflected from its centered position. The joystick 50 is returned to its neutral position by biasing springs. This safety feature causes all powered actuation to cease when the driver releases the joystick 50. This is discussed in greater detail in explanations of control logic modes.

Sensor Reading

The control system needs information, or data, such as the position of components, to make control decisions. Some of this data is acquired by optical encoders and potentiometers. Optical encoders and potentiometers are used to sense the position of wheelchair components and nearness of the components to stairs, floor, or slope. An electronic pendulum senses the pitch attitude of the wheelchair 112. These sensors are discussed more fully in the following paragraphs. These sensors are used to generate signals which are input to the control system 801.

Figure 18:
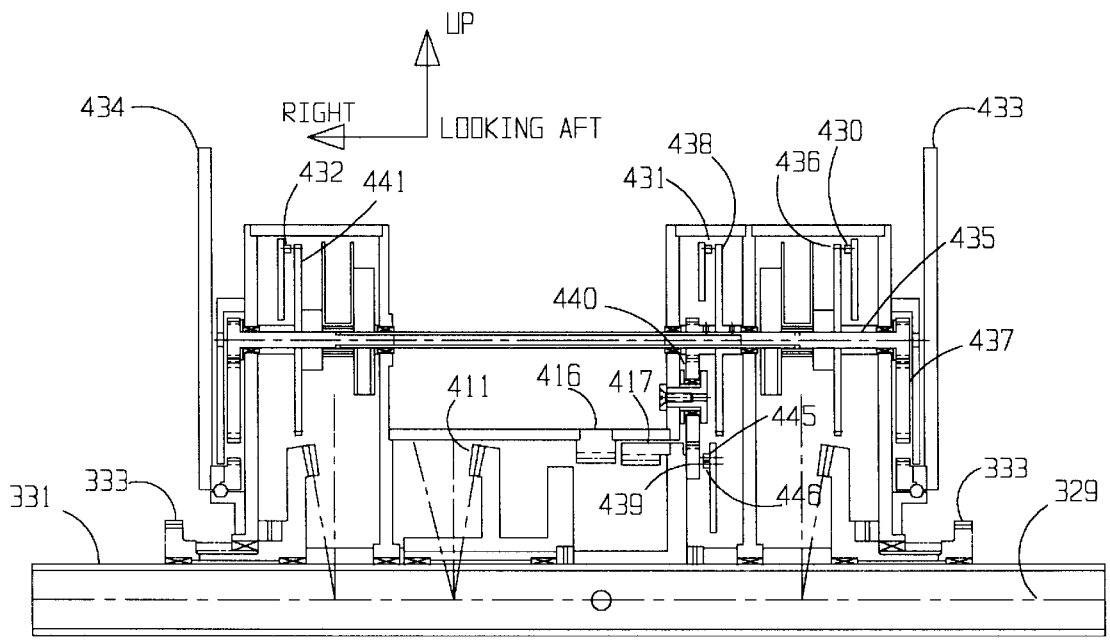
FIG. 18 is a cross-sectional view taken through a radial portion of FIG. 9 illustrating a spider wheel engagement sensor system.
Figure 27:
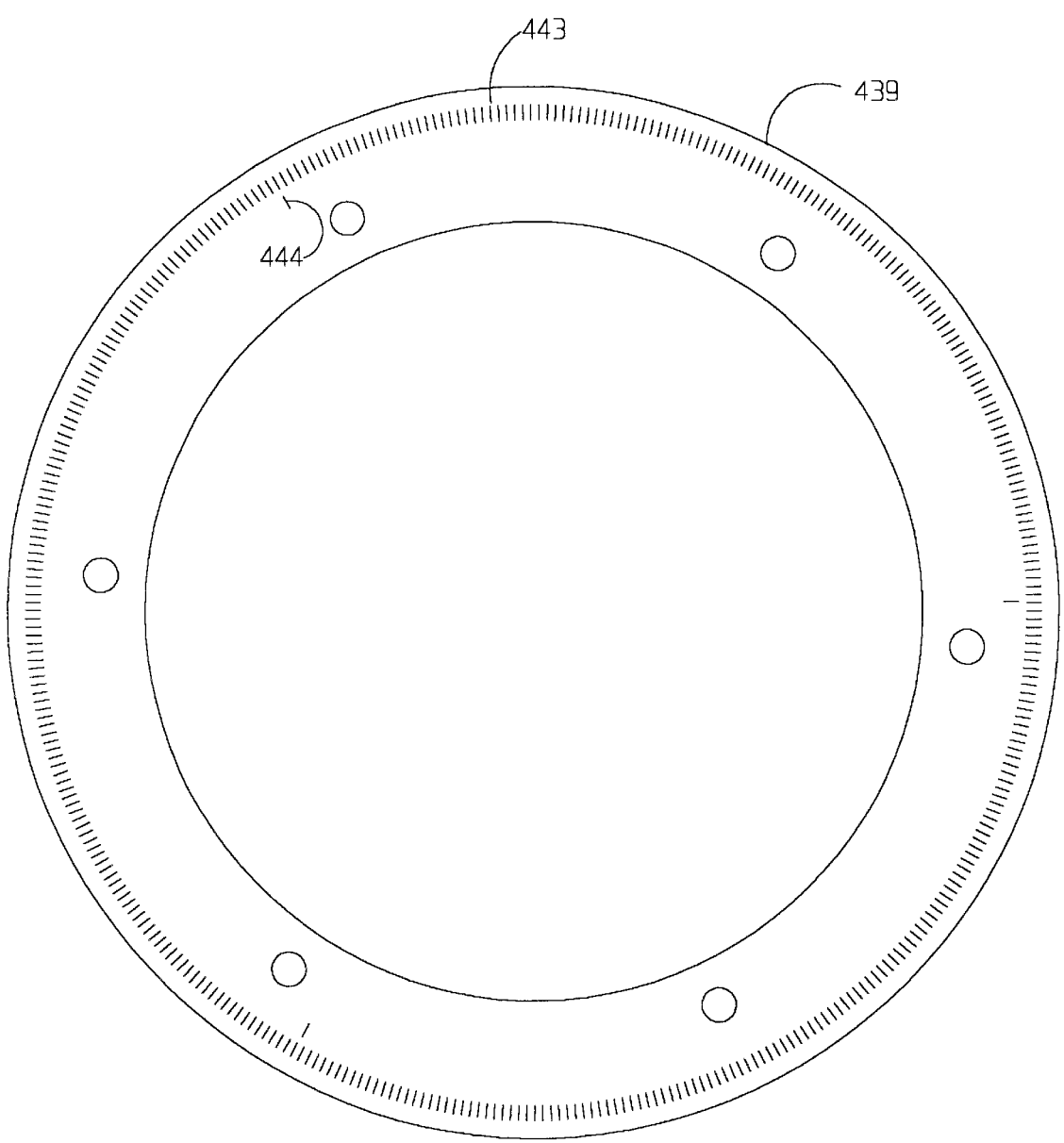
FIG. 27 is side view of a spider wheel position optical encoder target.

FIGS. 18, 27—Spider wheel Position Reading

The rotary position of the spider wheels 332 and 334 is sensed by using two optical encoders 445 and 446, and two bands of radial bars 443 and 444 on spider wheel sensing disk 439. See FIGS. 18 and 27. These optical encoders 445 and 446 are well known devices such as HEDR-8000 Reflective Optical Surface Mount Optical Encoders as manufactured by Hewlett Packard of Santa Clara, Calif. They are used to count the edges of parallel bars or radial bars as they pass the optical encoder. The encoder generates square wave signals corresponding to the passage of the radial bars. The control system 801 includes encoder readers that sum up the voltage state changes of the square waves. Two counting signals, one being slightly behind the other, are generated by the encoder to permit the signals to be used to reverse the count when the direction of movement of the bars is reversed. The use of encoders is well known and practiced.

The spider wheel position encoder 445 senses movement of a quantity of 384 radial bars 443 in a band on a disk 439 that is directly indexed to the spider wheels 332 and 334. See FIG. 27. Note: 384 divided by 3 is 128 yielding 128 radial bars per each of three spokes 330.

Since there are three spokes 330 in the spider wheel 332 and 334, the spokes 330 are spaced at 120° about the axis 329. The control system only needs to know the angle of one spoke 330A, 330B, or 330C and uses the aft lower one. The 0° spider angle is when one spoke 330 is located directly aft of the axis 329 and parallel to plane 148. The spider angle is represented by the data variable THETA in the control system algorithm equations and criteria. THETA is measured clockwise as viewed from the driver's left side.

The indicated THETA measurement is reset at every 128 bars (or 120°) or when the spoke indexing encoder 446 senses one of three radial bars 444, which are spaced at 120°. The indicated THETA is changed from 120° to 0° when spider wheels 332 and 334 are rotating clockwise and reset. For counter-clockwise rotation, the indicated angle is reset from 0° to 120°. Thus the indicated angle is always a positive number between 0° and 120°. The resetting by encoder 446 and radial bars 444 serves to correct the angle in the event that the indicated angle is in error at power up, after a power interruption, or for any other reason.

Front Skids Position Reading

The position of the front skids 605 is a function of the extended length of the front skids actuator 621. The front skids actuator's 621 extended length is directly proportional to the number of revolutions of front skids actuator motor 620. Motor revolutions are tracked by a motion control processor in the control system and an encoder on the motor 620. Motor revolutions read from the motion controller are an indication of the front skids 605 position. The motion control processor is one such as LM628 as manufactured by National Semiconductor Corporation of Santa Clara, Calif.

A reed switch on the front skids actuator 621 is switched when the actuator 621 is near its retracted length. The control system uses this switching to reset the indicated actuator length. Reed switches are commonly used on screw type actuators and located near the extremes of travel for the purpose of killing power to avoid driving the actuator against the end of travel stops.

Caster and Rear Skids Position Reading

The rear caster 502 and rear skids 505 position is sensed in the same manner as the front skids 605 using the caster actuator 521.

FIG. 23—Skid Engagement Reading

A skid runner 606 is suspended from the skid support link 625 by a runner four bar linkage 607. See FIG. 23. The skid runner 606 is used to sense the engagement status of the front skids. Engagement use herein means proximity or nearness of the skids to the stairs, floor, or slope. The engagement options are that the front skids 605 are either not in contact with stairs, near stairs (contacting but not loaded), or loaded against the stairs.

The shaft of a caster position potentiometer 608 is indexed to one link of the linkage 607. An electrical voltage signal is varied by the potentiometer 608 in proportion to the rotation of the linkage 607. In its undeflected state such as with skid runner 606 hanging or just barely contacting the stairs, the potentiometer 608 outputs a low voltage signal. The skid runner 606 is biased, or tends to be moved to and held, at the undeflected position by its own hanging weight. Thus the lowest voltage indicates that the runner is not or may be just contacting the stairs and floor. The control system 801 makes the conservative assumption that the runner is not contacting the stairs or floor at the lowest voltage.

When the skid runner 606 has contacted a supporting surface, such as the stairs 777 or floor 776, and the skid support link 625 moves closer to the stairs 777 or floor 776, then the skid runner 606 begins to deflect the linkage 607. The potentiometer 608 rotates and outputs a higher voltage signal. The potentiometer 608 outputs its highest voltage when the linkage 607 is fully deflected or loaded. This loading occurs when the front skids 605 are providing balancing support of the wheelchair. Thus the potentiometer 608 provides a load-sensing method for sensing when the front skids 605 are subjected to loading. The control system 801 also uses the voltage output by the potentiometer 608 for controlling the engagement of the skids 605. The same load-sensing and engagement control methods are used for the rear skids 505 and a similar method is used for the rear caster 502.

Signals for both left and right front skids 605 are sent to an analog input card on the control system 801. The control system 801 evaluates the two signals and uses the maximum value for control of wheelchair 112 operations. Nearness of the front skids 605 to the stairs is used by the control system 801 to ensure that the front skids 605 are maintained near the stairs to ensure stability.

FIG. 22—Rear Skids and Caster Proximity to Stairs Measurement

The control system 801 uses an indication of nearness of both rear skids 505 to the stairs and the caster wheels 544A and 544B to a vertical surface in controlling the wheelchair 112. See FIG. 22. Nearness of the rear skids 505 to stairs is measured in the same manner as on the front skids 605. Nearness of the caster wheels 544A and 544B to vertical surfaces is sensed measuring vertical deflection of the caster shaft 534.

The caster shaft 534 is permitted to slide along axis 503 which is defined by two caster bearings 533 on the rear caster 502. See FIG. 22. Vertical deflection along axis 503 is sensed by a voltage signal output from caster position potentiometer 535. A shaft of potentiometer 535 is indexed to an extension sensing bell crank 536 which has a rounded surface that contacts the top of the caster shaft 534. Vertical movement of the caster shaft 534 rotates the bell crank 536 and the potentiometer 535. The rounded surface of the bell crank 536 is spring loaded to hold it against the top of the caster shaft 534.

The bell crank 536 is undeflected when the caster shaft 534 is moved down fully along axis 503. This is the case when the rear caster 502 ed off the floor 776 or stairs 777. When the bell crank 536 is undeflected, the potentiometer 535 output signal voltage is low. As the caster shaft 534 moves up along axis 503, the bell crank 536 begins to rotate and the potentiometer 535 output signal voltage increases in proportion to the motion or deflection. The highest potentiometer 535 output voltage is produced when the caster shaft 534 is moved up along axis 503 to its full up position. This occurs when the rear caster 502 is providing balancing support of the wheelchair 112.

Signals for left rear skid 505, right rear skid 505, and rear caster 502 are sent to the control system 801. The control system 801 evaluates the three signals and uses the maximum value for control of wheelchair 112 operations. Control logic will be explained in greater detail later. Proximity or nearness of the rear skids 505 and rear caster 502 to the stairs or vertical surfaces is used by the control system 801 to hold the rear skids 505 or rear caster 502 near the stairs 777 or floor 776 to ensure stability.

Balancing devices 650, consisting of the front skids 605, rear skids 505, and rear caster 502 are used to safeguard against tipping forward or backward during stair climbing. The control system 801 combines signals from the balancing devices to generate an indication that these balancing devices 650 are in place to guard against tipping. At least one skid runner 606 and at least one rear supporting device must have at least some deflection, before stair climbing continues. The balancing devices 650 are adjusted if necessary. The rear supporting devices include the rear caster 502 and runners on the rear skids 505.

The control system 801 also generates an indication that both front and rear supporting devices are not fully deflected. If at least one front and one rear balancing devices are fully deflected, it would indicate that drive wheels 340 and 342 were not resting on the floor 776 or stairs 777 as necessary for traction during stair climbing. The balancing devices 650 are adjusted if necessary, before stair climbing continues.

Figure 26:
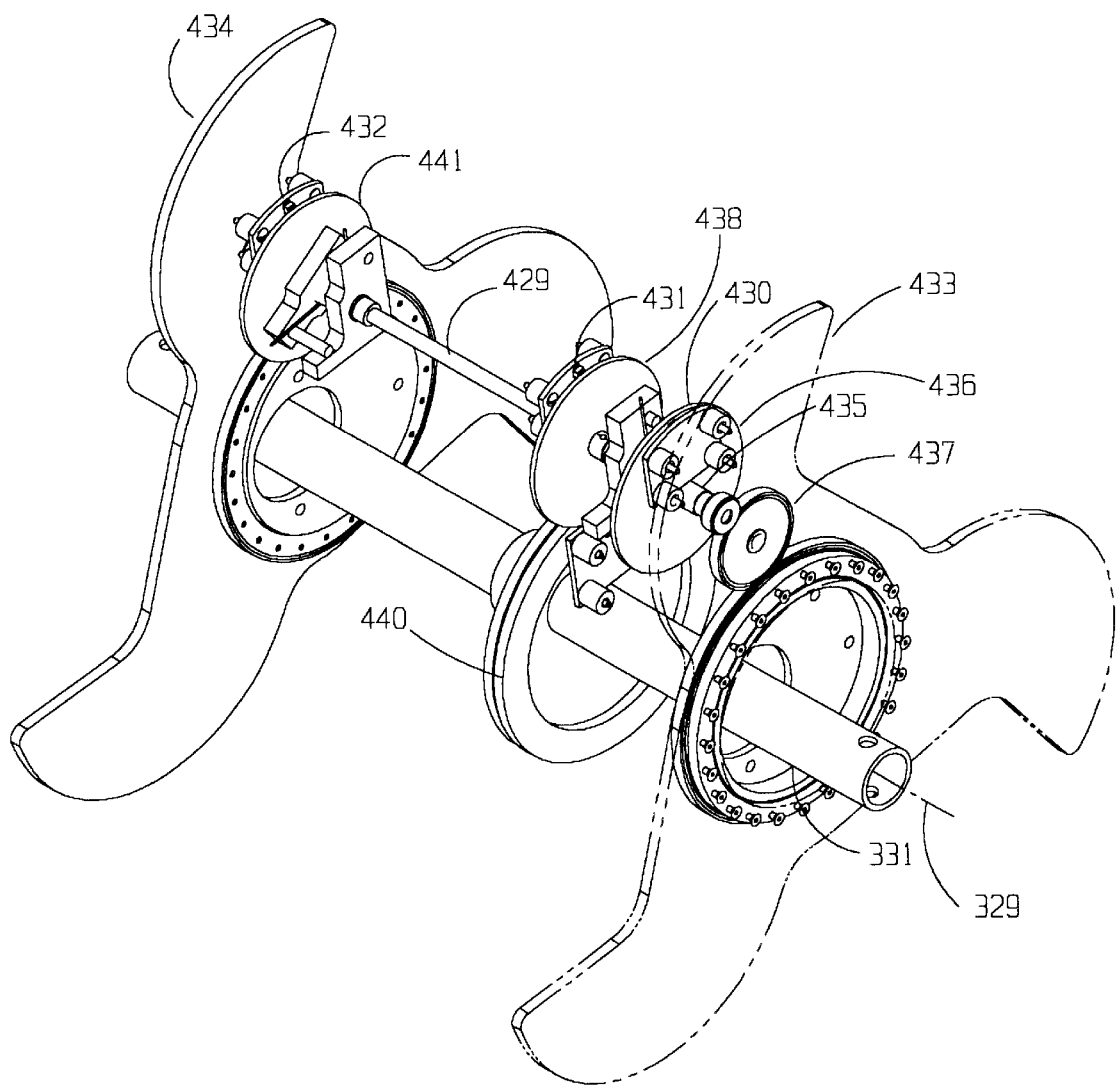
FIG. 26 is an isometric view of a sensing system for determining the nearness of the spider wheel to stairs.

FIGS. 18, 26—Spider Wheel to Stair Engagement Measurement

Signals indicating the engagement of the spider wheels 332 and 334 to stairs are generated using inputs from three encoders: a left encoder 430, a reference datum encoder 431, and a right encoder 432. See FIGS. 18 and 26. These optical encoders are similar to the HEDR-8000 encoder as manufactured by Hewlett Packard of Santa Clara, Calif.

The left encoder 430 is used to count edges on radial bars of sensing disk 436 which is rigidly attached to an engagement sensing shaft 435 that is connected by gearing 437 to the left engagement sensing cam 433. The reference datum encoder 431 counts edges on radial bars of sensing disk 438 that is connected by gearing 440 to the spider wheel shaft 331. The right engagement sensor 432 counts edges on radial bars of right sensing disk 441 connected by gearing to the right engagement sensing cam 434.

The left spider wheel 332 and right spider wheel 334 rotate at exactly the same angle as the left cam 433 and right cam 434 when the spider wheels 332 and 334 are rotating and the cams 433 and 434 are not contacting the stairs 777 or floor 776. In this case the count sums read from the encoders 430, 431, and 432 are all equal. The count difference between encoder 430 and 431 is zero, thus giving an indication that the left cam 433 is not contacting the stairs or ground. The same is true for the right side.

If the spider wheels 332 and 334 are rotating clockwise to climb stairs, and the left cam 433 is contacting stairs, the left cam 433 rotates through a greater angle than the spider wheels 332 and 334. In this case the count from the left encoder 430 is more than from the reference optical encoder 431. The count difference indicates engagement of the left cam 433 with stairs. The same is true for the right engagement cam 434. This indication works for both descending and ascending stairs.

The counts from three encoders 430, 431, and 432 are input to computer in the control system 801 and used to generate an indication of the engagement of the spider wheels 332 and 334 to the stairs.

Pitch Attitude Measurement

The wheelchair 112 has an electronic pendulum to provide a method for sensing the pitch attitude of the frame 100 with respect to an Earth level surface. The current pitch of the frame 100 is used in the control law equations to maintain the wheelchair 112 at the proper pitch attitude. The wheelchair's 112 control system takes different actions depending upon the pitch. The current pitch value is used to determine which one of several ranges the pitch resides.

Electronic pendulums are commercially available which are capable of sensing the pitch. One such electronic pendulum is manufactured by Lucas Sensing Systems of Phoenix, Ariz. One model of the electronic pendulums outputs a direct current voltage signal, which is proportional to the pitch attitude of the sensor. An electronic pendulum is included in the electronic control system 801 to measure the pitch of the wheelchair 112.

Figure 29:
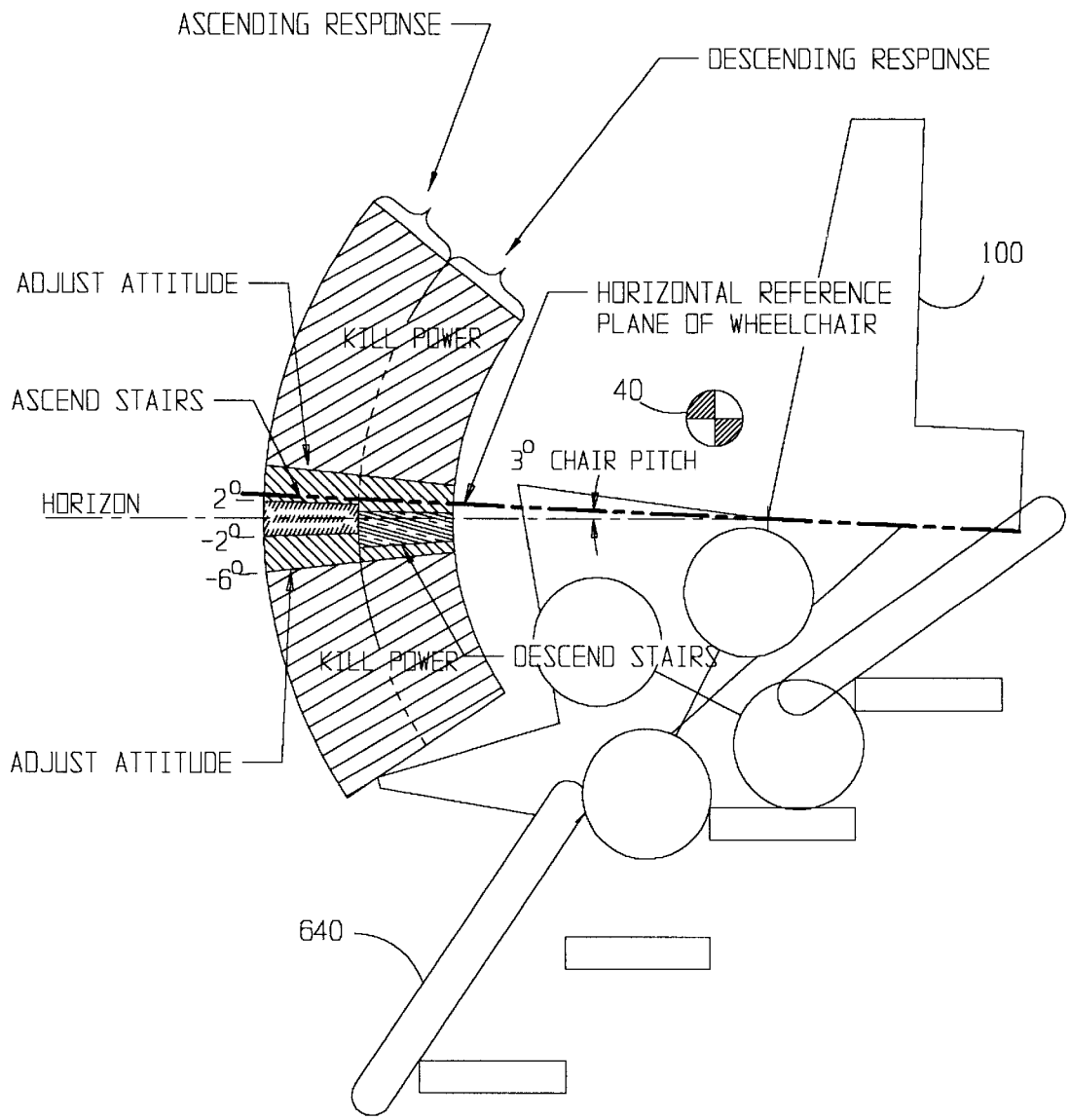
FIG. 29 is a side view of a schematic representation of the wheelchair as it climbs stairs depicting wheelchair response to pitch attitude.

FIG. 29—Pitch Operating Ranges for Stair Climbing

The pitch angle attitude operating ranges of the wheelchair 112 for stair negotiation are: (See FIG. 29.)

1) +2 to −2 degrees, for ascending movements on stairs;
2) +6 to +2 & −2 to −6 degrees, for pitch adjusting only when ascending stairs;
3) +1 to −4 degrees, for descending movements on stairs; and
4) +6 to +1 & −4 to −6 degrees, for pitch adjusting only when descending stairs.

There are exceptions to the range criteria above. For approaching ascending stairs and ending descending stairs, the spider wheels are adjusted relative to the wheelchair frame rather than adjust the wheelchair to pitch requirement. This will become apparent later.

In the preferred embodiment of this wheelchair 112, a wheelchair pitch voltage signal is sent to the control system 801. The pitch value is used to determine the current pitch range, and to maintain the wheelchair 112 at a desired pitch.

Computer

The control system 801 includes a digital computer mounted on a PC/104 standard card such as the ones manufactured by Arcom Control Systems of Kansas City, Mo. The computer retains operational instruction code and data when wheelchair 112 is powered off.

Several PC/104 interface cards are connected to the digital computer. They include PC/104 interface cards that convert analog and digital signals to digital data that is read and used by the digital computer to acquire information used to control the wheelchair 112. The interface cards are like those manufactured by Arcom and by ACS Tech 80 of Minneapolis, Minn. The several PC/104 interface cards also include servo cards that generate signals that control speed and direction of the motors. The servo cards are like those manufactured by Arcom and by ACS Tech 80. The electronics is powered by DC battery 802.

Motor Amplifiers

The motor servo output signals for each powered axis, or powered motion, go to a motor amplifier such as Model 405A servo amplifier as manufactured by Copley Controls Corporation of Westwood, Me. The amplifiers amplify servo output signals from the control system 801 to supply controlled current and voltage to the motors.

FIG. 29—Operation

In this description, the term "stair or slope climbing" shall be understood to refer to powered movement of the wheelchair 112 in either an upward or downward direction. It is simpler to talk about "stair or slope climbing" even if the wheelchair 112 is "climbing" downward. The same degree of control and safety is necessary in either direction. However, there are slightly different pitch angles for ascending and descending stairs. Normal level operation is similar to that of a conventional wheelchair 112.

The operating pitch range of the wheelchair 112 is designed to be different when it is going upstairs than when it is going downstairs. This is because the friction loads of the rear skids 505 and front skids 605 on the stairs act in different directions when the wheelchair 112 is moving in an ascending direction as contrasted with descending.

When the wheelchair 112 is ascending, skid friction resists climbing and resists tilting backwards. Selecting a more "nose-up" attitude moves the center of gravity 40 aft. The "nose-up" pitch range reduces the effort required to climb and is safe because ascending provides more resistance to tilting backward. When the wheelchair 112 is descending, the skid friction resists descending and tilting forward. Selecting a more "nose-down" attitude moves the center of gravity 40 forward. Conversely, the "nose-down" attitude reduces the effort required to descend and is safe because descending provides more resistance to tilting forward.

The difference between the ascending and descending response of the wheelchair 112 in these two stair-negotiation modes can be seen in FIG. 29. Neither range is so far from a normal level attitude as to cause the driver to be concerned about his or her safety.

As explained in the Sensor Reading section above, an integral part of wheelchair 112 is a sensing method for: monitoring the attitude of the frame with respect to the plane 148, and generating a corresponding signal. The generated signal is used to maintain the attitude within the proper pitch range and to interrupt either propulsion or attitude adjustment of the wheelchair 112 if necessary to prevent the wheelchair 112 from reaching an out-of-balance condition.

FIG. 25 Mode Switches

Shown in FIG. 25 are momentary-on switches 54, 55, 56, and 57 with interior lights for requesting the level (MLL), slope (MPL), stair (MSL), and recline (MRL)modes. If the control system 801 activates the requested mode, the light in the corresponding button will light up and will remain illuminated until another button is pushed and that mode is activated. Certain conditions must exist before a mode can be activated. For example, when the wheelchair 112 is in the middle of a flight of stairs and the skids are extended, etc., the logic in the on-board control system 801 prevents activating the level mode (MLL).

Figure 30A:
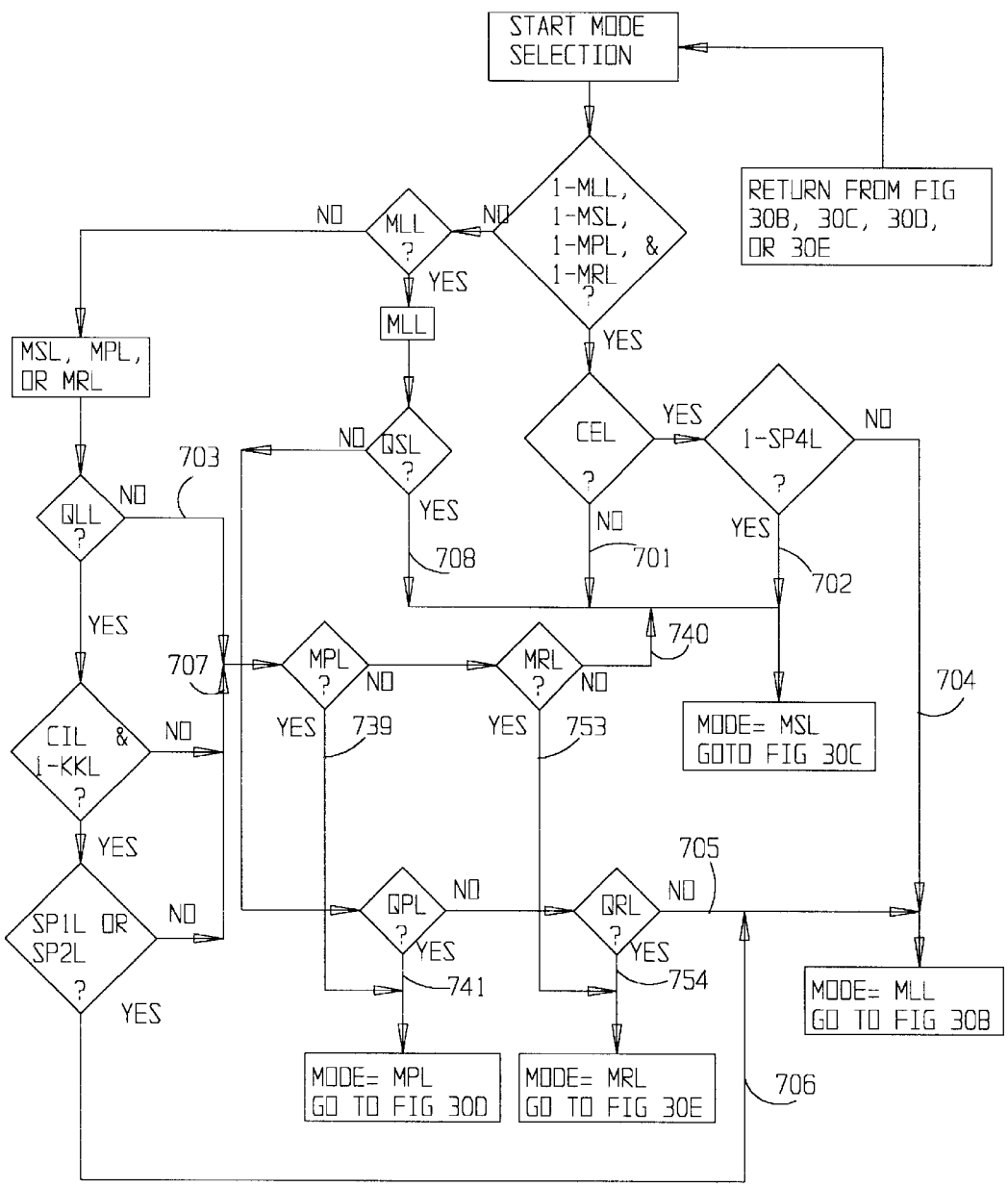
FIG. 30A is a logic diagram for the activation of operation modes of the wheelchair.

FIG. 30A—Mode Activations

Mode activation is shown in a flow chart in FIG. 30A. The control system 801 continually cycles through the logic algorithms to determine the proper mode. The letters in the flow chart boxes are shorthand for codes shown in Tables 1 through 5. In the equations and in the text "1-" indicates not true. For example "1-MSL" indicates that the stair mode is not active. It is a convenient expression for logic equations where 1 is true and 0 is false. For example if MSL=1 then 1-MSL=0.

Examining the logic flow of FIG. 30A, if none of the modes is active (1-MLL, 1-MSL,1-MPL,1-MRL), the rear caster 502 is not fully down (1-CEL), then the stair mode (MSL) is activated. See path 701. See also Table 1 for codes of the Operation Modes, Table 3 for Criteria Codes, and Table 5 for Data Signals. If none of the modes is activated (1-MSL, 1-MLL, 1-MPL, 1-MRL), the caster is fully down (CEL), and no spider wheel spoke 330 (1-SP4L) is at 28°, then stair mode (MSL) is activated. See path 702. If none of the modes are active, the rear caster 502 is fully down, and a spider wheel spoke 330 is at 28° (1-MSL, 1-MLL, 1-MPL, 1-MRL, CEL, SP4L), then the level mode (MLL) is activated. See path 704.

TABLE 1

Codes for Operation Mode

| CODE | MEANING |
|---|---|
| MLL | LEVEL MODE ACTIVE |
| MSL | STAIR MODE ACTIVE |
| MPL | SLOPE MODE ACTIVE |
| MRL | RECLINE MODE ACTIVE |
| QLL | LEVEL MODE REQUESTED |
| QSL | STAIR MODE REQUESTED |
| QPL | SLOPE MODE REQUESTED |
| QRL | RECLINE MODE REQUESTED |

If the stair (MSL), slope (MPL), or recline (MRL) mode is active and the level mode (1-QLL) is not requested, then the active mode stays active. See path 703 and 740 for stair mode (MSL), path 703 and 739 for slope mode (MPL), and path 703 and 753 for recline mode (MRL).

If the level mode is active and no other mode is requested (MLL, 1-QSL, 1-QPL, 1-QRL) then the level mode (MLL) stays active. See path 705. If level mode (MLL) is active and another mode is requested then that mode is activated. See path 708 for stair mode, 741 for slope mode, and 754 for recline mode.

TABLE 2

COMMAND SIGNALS

| CODE | MEANING |
|---|---|
| CEA | CASTER DRIVE COMMAND (+=DOWN, −=UP) |
| DLA | LEFT DRIVE MOTOR COMMAND (+=FORWARD, −=BACKWARD) |
| DRA | RIGHT DRIVE MOTOR COMMAND (+=FORWARD, −=BACKWARD) |
| KEA | SKID DRIVE COMMAND (+=DOWN, −=UP) |
| SPA | SPIDER DRIVE COMMAND += clockwise as viewed from the driver's left side |

If the stair, slope, or recline mode is active (MSL, MPL, or MRL), the level mode is requested (QLL), the rear caster 502 is down or near down (CIL), the front skids 605 are not down (1-KKL), and the spider wheels 332 or 334 are mostly level (SP1L or SP2L), then the level mode is activated (MLL). See path 706. If the front skids 605, spider wheels 332 and 334, and rear caster 502 positions prevent level mode activation (MLL), then the active mode remains active. See paths 707 and 739 for slope, paths 707 and 740 for stair, or paths 707 and 753 for recline mode.

The indications of path 706 and control system 801 logic provide a position sensing method for detecting when:

(1) the front skids 605 are not below an intermediate position (1-KKL), (2) the drive wheels 340 and 342 of each spider wheel 332 and 334 are resting on the same level surface (SP1L or SP2L), and (3) the rear caster 502 and rear skids 505 are at a near down or fully down position (CIL).

TABLE 3

Criteria

| CODE | MEANING |
|---|---|
| AAML | ATTITUDE ASCEND MOVEMENT RANGE: −2° < CAA < 2° |
| ADML | ATTITUDE DESCEND MOVEMENT RANGE: −4° < CAA < 1° |
| APML | ATTITUDE SLOPE MOVEMENT RANGE: −2° < CAA < 2° |
| ARML | RECLINE MOVEMENT RANGE: −6° < CAA < 15° |
| ASL | ATTITUDE SUPPORT ADJUSTMENT RANGE: −6° < CAA < 6° |
| CEL | CASTER AT: 27.9 cm < HR < 28.9 cm (11.00" < HR < 11.37") OR CASTER FULLY DOWN |
| CIL | CASTER DOWN OR NEAR DOWN: HR < 31.8 cm (HR < 12.5") |
| CTR | JOYSTICK CENTERED OR UNDEFLECTED |
| CSUPL | CASTER AND REAR SKIDS NOT SUPPORTING |
| JAL | JOYSTICK MOVED FORWARD |
| JBL | JOYSTICK MOVED AFT |
| KKL | SKID IN MID TO DOWN POSITION: 36.8 cm < KQ <= 48.3 cm (14.50" < KQ <= 19.00") |
| KRL | SKID AT: 33.0 cm < KQ < 34.0 cm (13.00" < KQ < 13.37") OR SKID FULLY RETRACTED |
| NBSTL | FRONT AND REAR SUPPORT DEVICES NOT BOTH LOADED |
| NSDL | FRONT AND REAR SKIDS OR CASTER NEAR STAIRS OR FLOOR |
| SP1L | ONE SPIDER SPOKE AT: 24.0° < THETA < 31.0° |
| SP2L | ONE SPIDER SPOKE AT: 27.6° < THETA < 35.0° |
| SP3L | ONE SPIDER SPOKE AT: 24° < THETA < 28.6° |
| SP4L | SPIDER AT: 27.6° < THETA < 28.6° AFT SPIDER SPOKE AT APPROXIMATELY 28° |
| SP5L | ONE SPIDER SPOKE AT: 28.6° < THETA < 31° |
| SP6L | ONE SPIDER SPOKE AT: 28.6° < THETA < 35° |
| SP7L | SPIDER AT: 0° < THETA < 35.0° or 76° < THETA < 120.0° |
| SPCDL | SPIDERS ENGAGED OR NEAR THE STAIRS |
| SSUPL | FRONT SKIDS NOT SUPPORTING |

The sensing of path 706 indicates that the wheelchair 112 is resting on a level surface. Therefore the wheelchair 112 is in a safe position for operation in the level mode.

TABLE 4

STAIR CLIMBING REGIMES

| CODE | MEANING |
|---|---|
| AAL | Approach Ascending Stairs |
| ABL | Ascending Stairs |
| ADL | Approach Descending Stairs |
| AEL | Descending Stairs |
| AFL | End Descending Stairs |
| RALA | Approach Ascending Stairs Regime- Adjustment Only |
| RBLA | Approach Ascending Stairs Regime- Movement and Adjustment |
| RALB | Ascending Stairs Regime- Adjustment Only |
| RBLB | Ascending Stairs Regime- Movement And Adjustment |
| RALD | Approach Descending Stairs Regime- Adjustment Only |
| RBLD | Approach Descending Stairs Regime- Movement and Adjustment |
| RALE | Descending Stairs Regime- Adjustment Only |
| RBLE | Descending Stairs Regime- Movement and Adjustment |
| RALF | End Descending Stairs Regime- Adjustment Only |
| RBLF | End Descending Stairs Regime- Movement and Adjustment |

Figure 7:
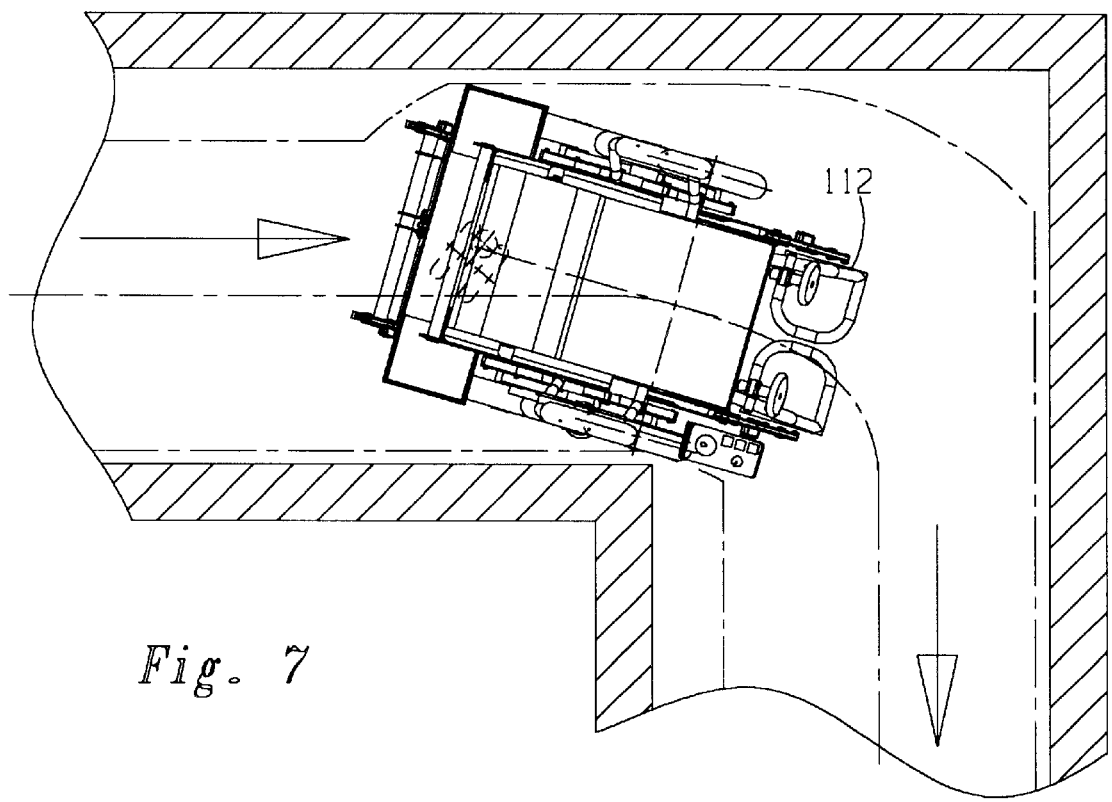
FIG. 7 is a view that illustrates the wheelchair's ability to turn 90-degrees in a 71.1-centimeter (28-inch) hall.

FIGS. 1, 2, 7—General Operation

Normal level operation is similar to that of a conventional wheelchair. Turning is accomplished by powering the left and right drive wheels 340A and 342A at different speeds. FIG. 7 illustrates the wheelchair's 112 ability to turn 90-degrees in a 71.1-centimeter (28-inch) hall. For level operation, the wheelchair 112 is supported by the forward drive wheels 340A and 342A of each spider wheel 332 and 334. The spider wheels 332 and 334 are locked at a slight angle with the rear caster 502 deployed and the rear drive wheels 340C and 342C off the ground by about 9 millimeters (0.35 inches). The clearance of drive wheels 340C and 342C is the result of the 2-degree rotation of the spider wheels 332 and 334 as was previously discussed. See FIG. 1. This prevents tire scrubbing or slipping sideways during turns.

A spring-loaded brake on the spider wheel drive motor 469 locks the spider wheels 332 and 334. The front skids 605 are pivoted from the lower front corners of frame 100. See FIG. 1. The front skids 605 are retracted for level operation. Front skids actuator 621 and caster actuator 521 move linkages to operate the front skids 605 and rear caster 502. The rear caster 502 is moved forward and up, front skids 605 are moved forward and downward to prepare the wheelchair 112 for its stair-climbing mode. The front skids 605 provide anti-tip stability in the level mode. However they are high enough to permit approaching an obstacle such as a doorsill or a small board lying on the ground.

TABLE 5

DATA SIGNALS

| NAME | SIGNAL |
|---|---|
| CAA | Wheelchair Attitude Signal: += Nose Up, .06 v Per Deg |
| CGA | Caster & Rear Skid Engagement, Combined: 12 v = Full engagement |
| JLA | Joystick Command Speed, Left: +12 v = Full Forward |
| JLE | Joystick Deflection, Absolute: +12 v = Full deflection |
| JRA | Joystick Command Speed, Right: +12 v = Full Forward |
| HR | Rear Skid/Caster Actuator Length: cm (In) |
| KGA | Front Skid Engagement combined: +12 = Full engagement |
| KQ | Front Skid Actuator Length: cm (In) |
| SGA | Spider Engagement, Combined: +12 v = Full engagement |
| THETA | Spider Angle += Clockwise From Aft Horizontal, in degrees |

Operation Terminology

The term left joystick when used herein refers to the first of two potentiometers on the joystick 50 that is associated with the left propulsion motor 468. Conversely, the term right joystick is associated with second potentiometer that is associated with the right propulsion motor 470. The joystick potentiometers are also used for operating other motors as will become apparent. As previously mentioned, spider wheels 332 and 334 angle, THETA, is measured clockwise from a horizontal line extending aft from the axis 329 and to the center line of the first spoke 330 encountered.

Figure 28:
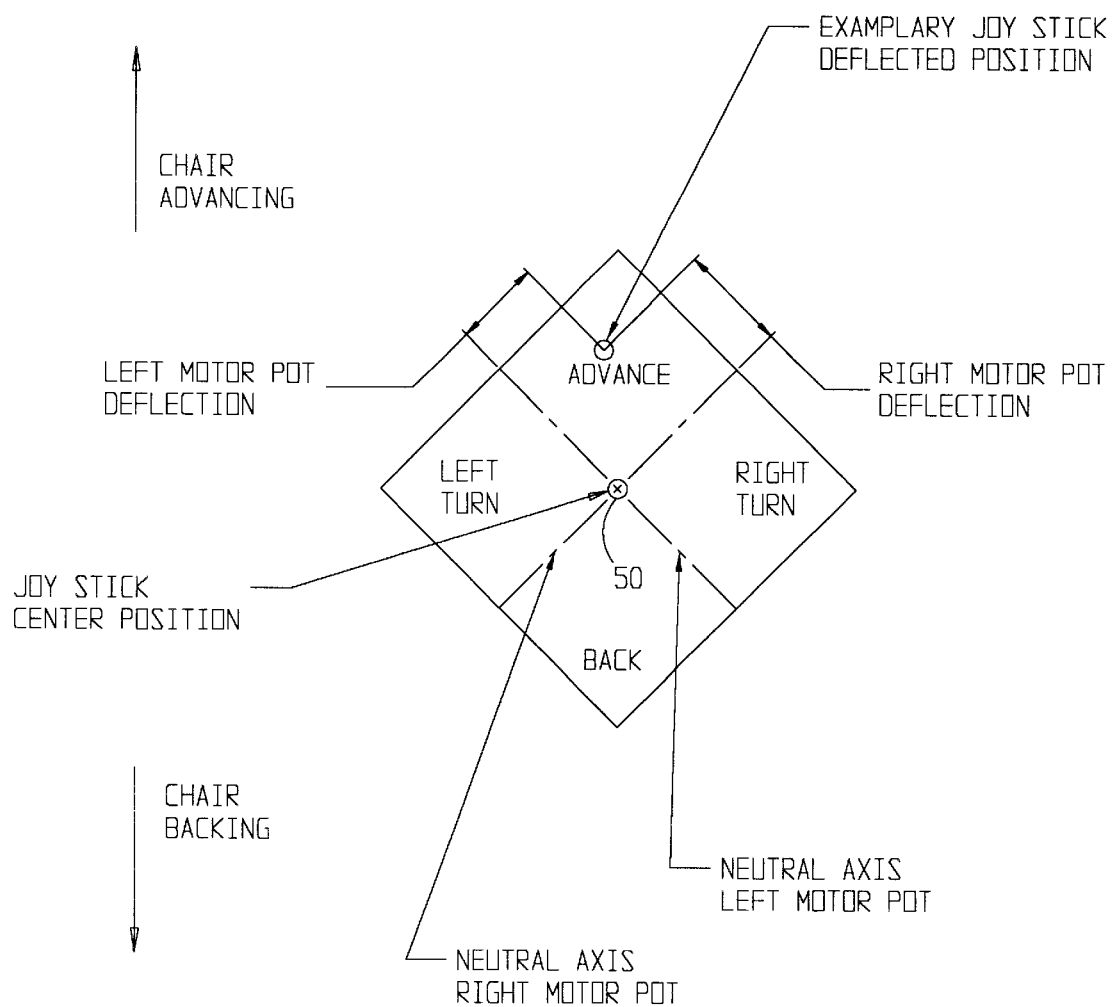
FIG. 28 is a schematic illustration of the response of propulsion motors that are employed to both propel and change the direction of movement of the wheelchair.
Figure 30B:
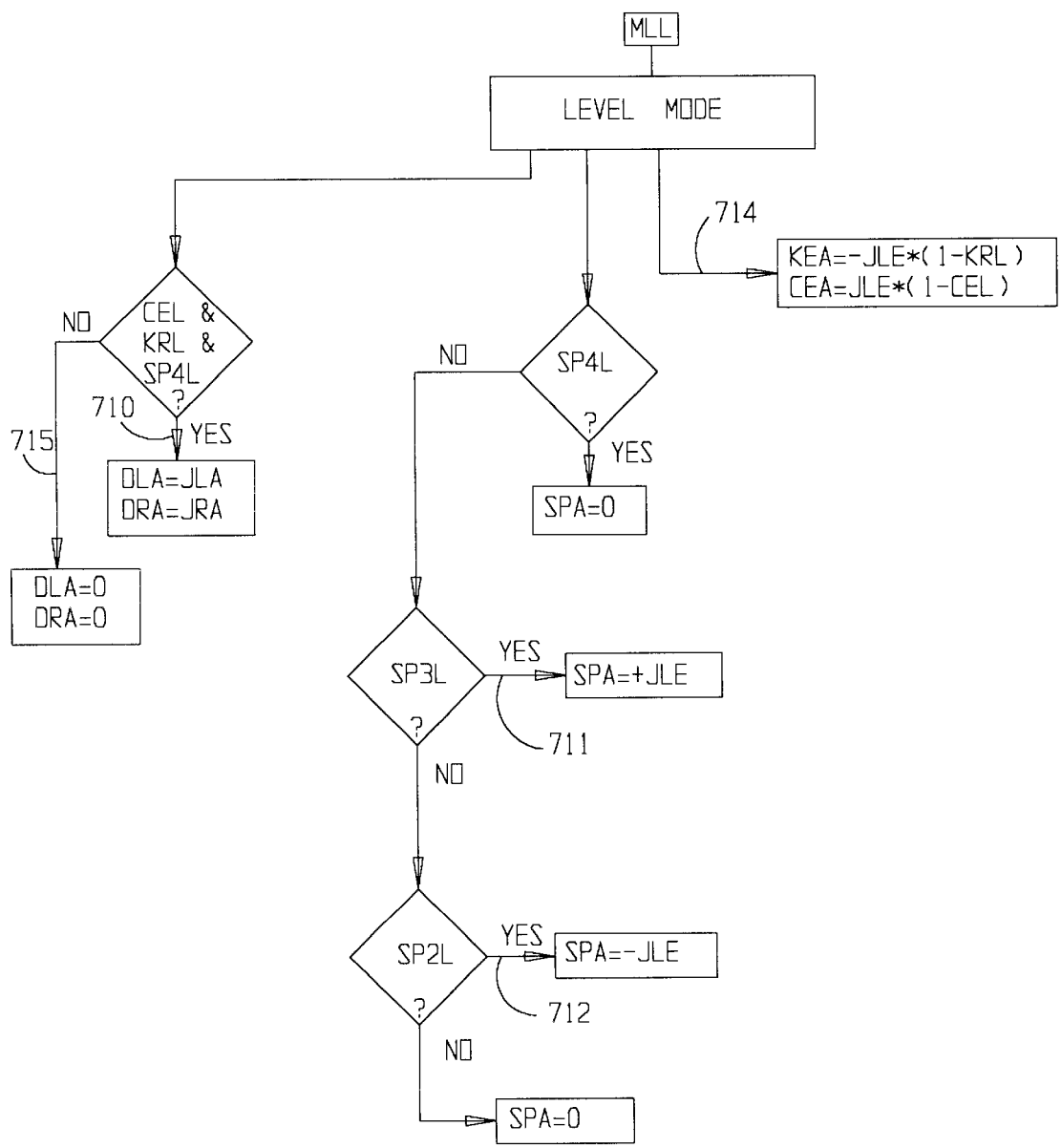
FIG. 30B is a logic diagram for the wheelchair's level operation mode.

FIGS. 30B, 28—Level Mode Operation

Level mode operation is shown in the flow chart in FIG. 30B. Command signals are shown in Table 2, criteria in Table 3, data signals in Table 5. Examining the level mode (MLL) flow chart, no propulsion motion occurs until the rear caster 502 is fully down, the front skids 605 are fully up, and one spider wheel 332 is at 28° (CEL, KRL, SP4L). See path 710. Then the left and right propulsion drive motors 468 and 470 are driven at speeds and direction in proportion to the deflection of the joystick 50. The joystick 50 is a dual axis joystick with one potentiometer to command the left drive wheels 340 (DLA=JLA) and a second potentiometer to command the right drive wheels 342 (DRA=JRA). See path 710. See FIG. 28 for response to joystick 50 deflection. The wheelchair 112 moves in the direction the joystick 50 is pushed and at a proportional speed.

In the level mode (MLL), the wheelchair 112 components must be properly positioned before it is allowed to travel. The front skids actuator 621 is retracted until the front skids 605 are at the full up position (KEA=−JLE*(1-KRL)). Also the caster actuator 521 is extended until the rear caster 502 is at its full down position (CEA=JLE*(1-CEL)). See path 714. These two actuators 521 and 621 are driven at speeds that are proportional to the deflection of the left drive motor potentiometer of joystick 50.

If either the rear caster 502 is not fully down, the front skids 605 are not fully up, or no spider spoke 330 is at 28°, (1-CEL, 1-KRL, or 1-SP4L) then the propulsion motors are deactivated (DLA=0, DRA=0). See path 715. If the spider spoke 330 angle is at greater than 24.0° and less than 27.6° (SP3L & SP4L), then the spider wheels 332 and 334 are driven clockwise until the spider spoke 330 angle exceeds 27.6° (SPA=+JLE). See path 711. If the spider spoke 330 angle is greater than 28.6° and less than 35° (SP2L & SP4L), then the spider wheels 332 and 334 are driven counterclockwise until the spider spoke 330 angle is less than 28.6° (SPA=−JLE). See path 712. These operations provide a method for rotating both spider wheels 332 and 334 by a small angle during the horizontal-transport mode to the extent that only one of the drive wheels 340 and 342 associated with a given spider wheel 332 and 334 is in contact with the ground.

Stair Climbing Operations

All axis, or powered motions, are locked for safety and stability at all instances when the wheelchair 112 is not in powered motion. This prevents the wheelchair 112 moving or tipping when it is stopped on the stairs regardless of the wheelchair's 112 and driver's center of gravity 40 including when the driver is leaning forward or is reaching behind the wheelchair 112.

Steering is available while climbing stairs as required to permit realignment with the stairs or to follow stairs with a limited amount of spiral. The steering is done by driving the left and right 340 and 342 drive wheels at different rates, just like during level operations. Stair climbing with the wheelchair 112 at an angle to stairs is permitted because the balancing devices 650 are located on both the left and right sides of the wheelchair 112. Nearness or contacting of the balancing devices 650 is required on one side only. The wheelchair 112 can be moved sideways by alternately turning and moving up and down the stairs.

Figure 30C:
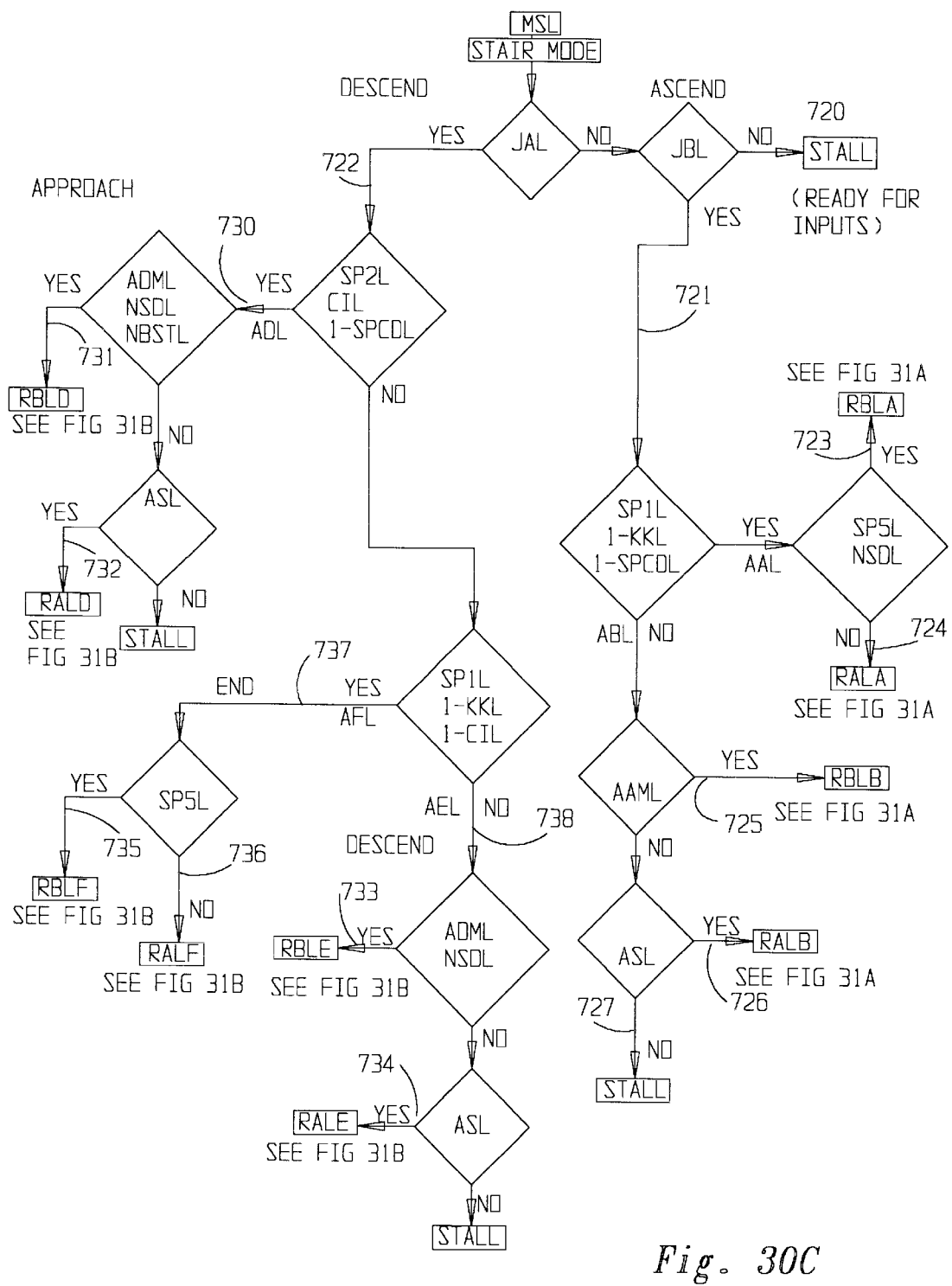
FIG. 30C is a logic diagram for the wheelchair's stair climbing mode.
Figure 30D:
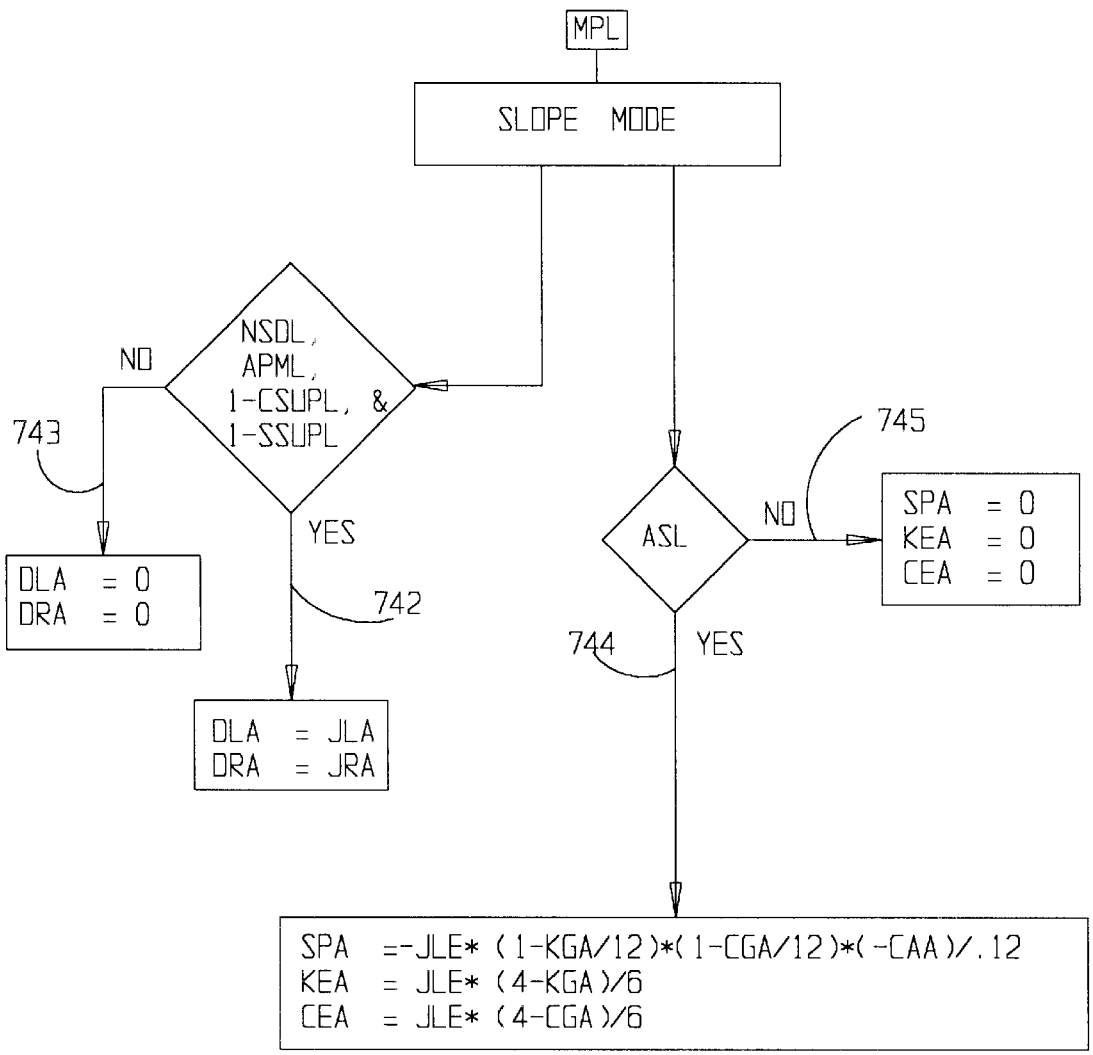
FIG. 30D is a logic diagram for the wheelchair's slope climbing mode.
Figure 30E:
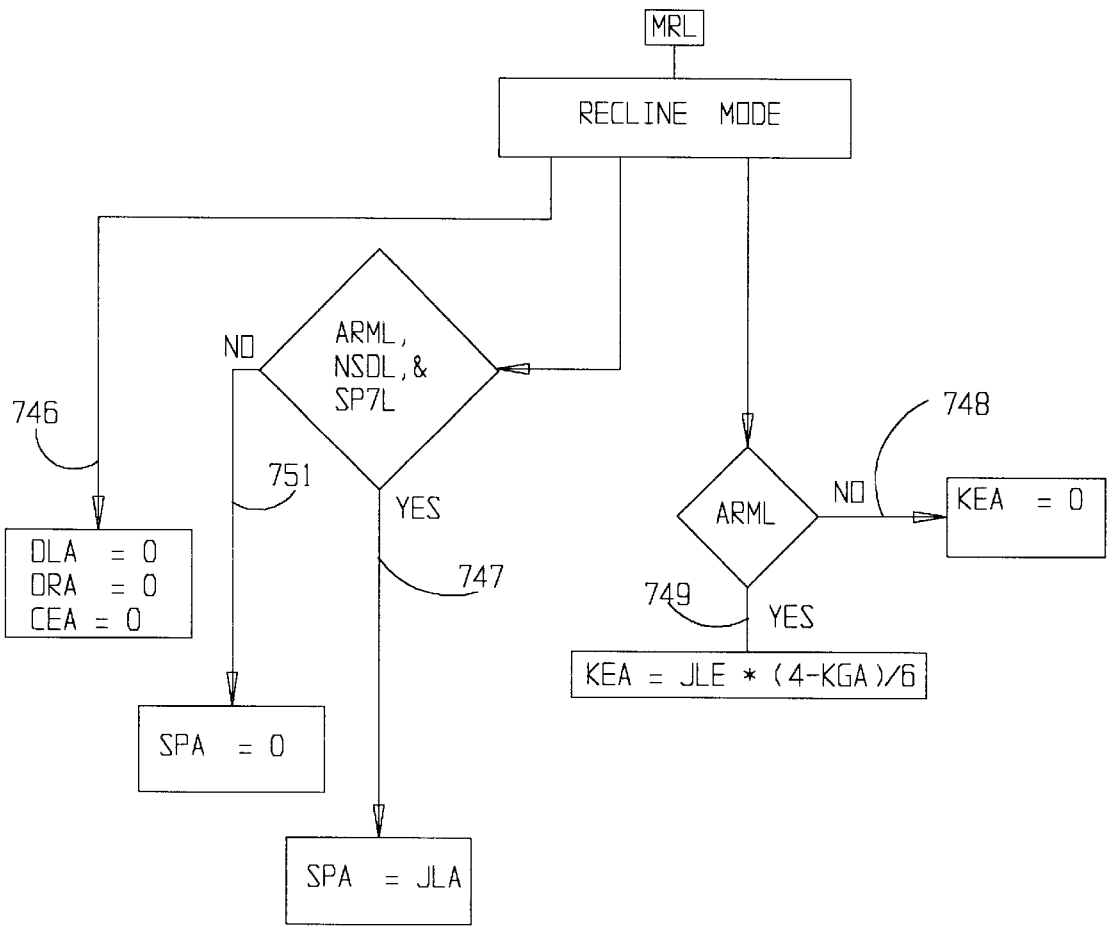
FIG. 30E is a logic diagram for wheelchair's recline mode of operation.
Figure 32:
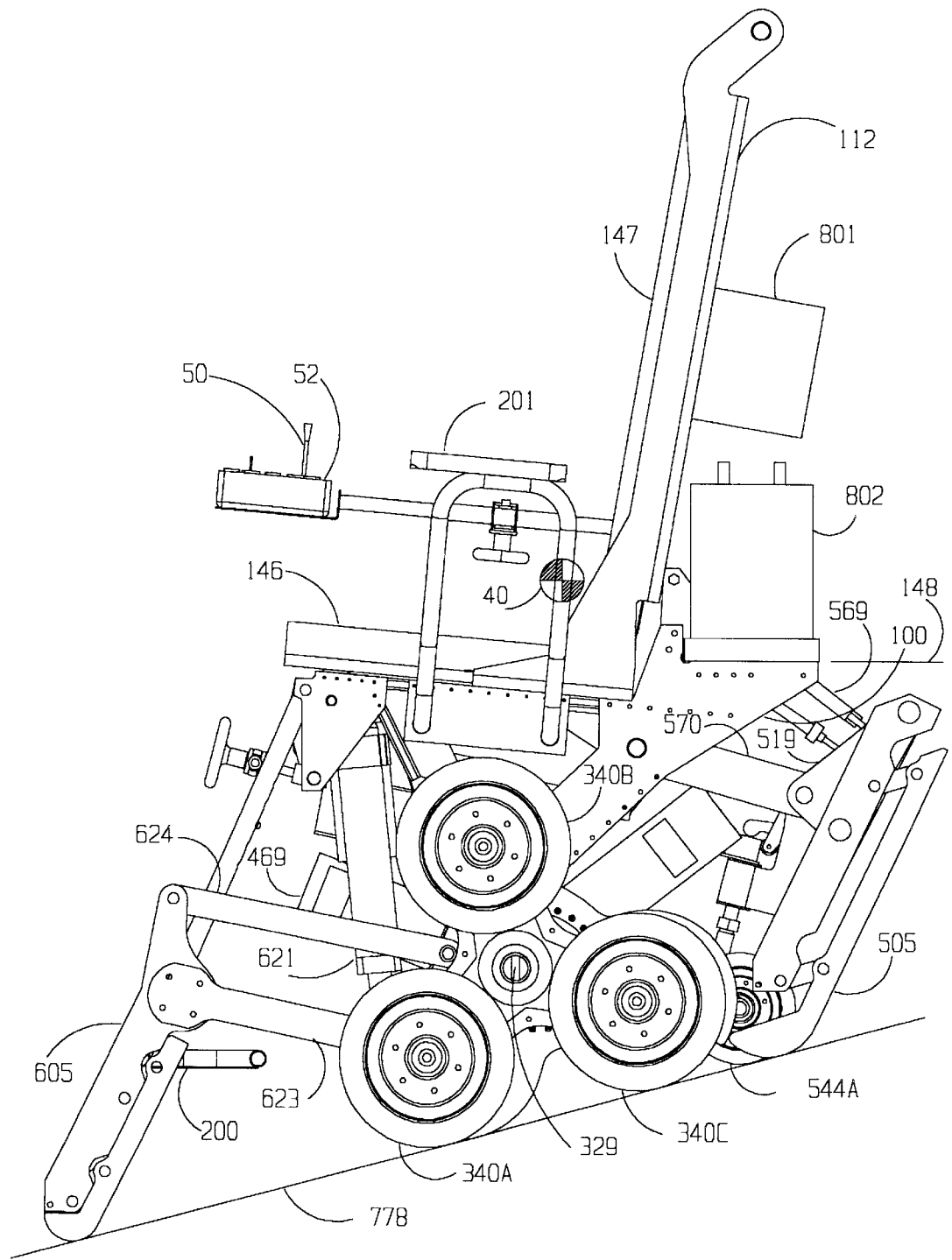
FIG. 32 is a side view of the wheelchair in the slope climbing mode.
Figure 33:
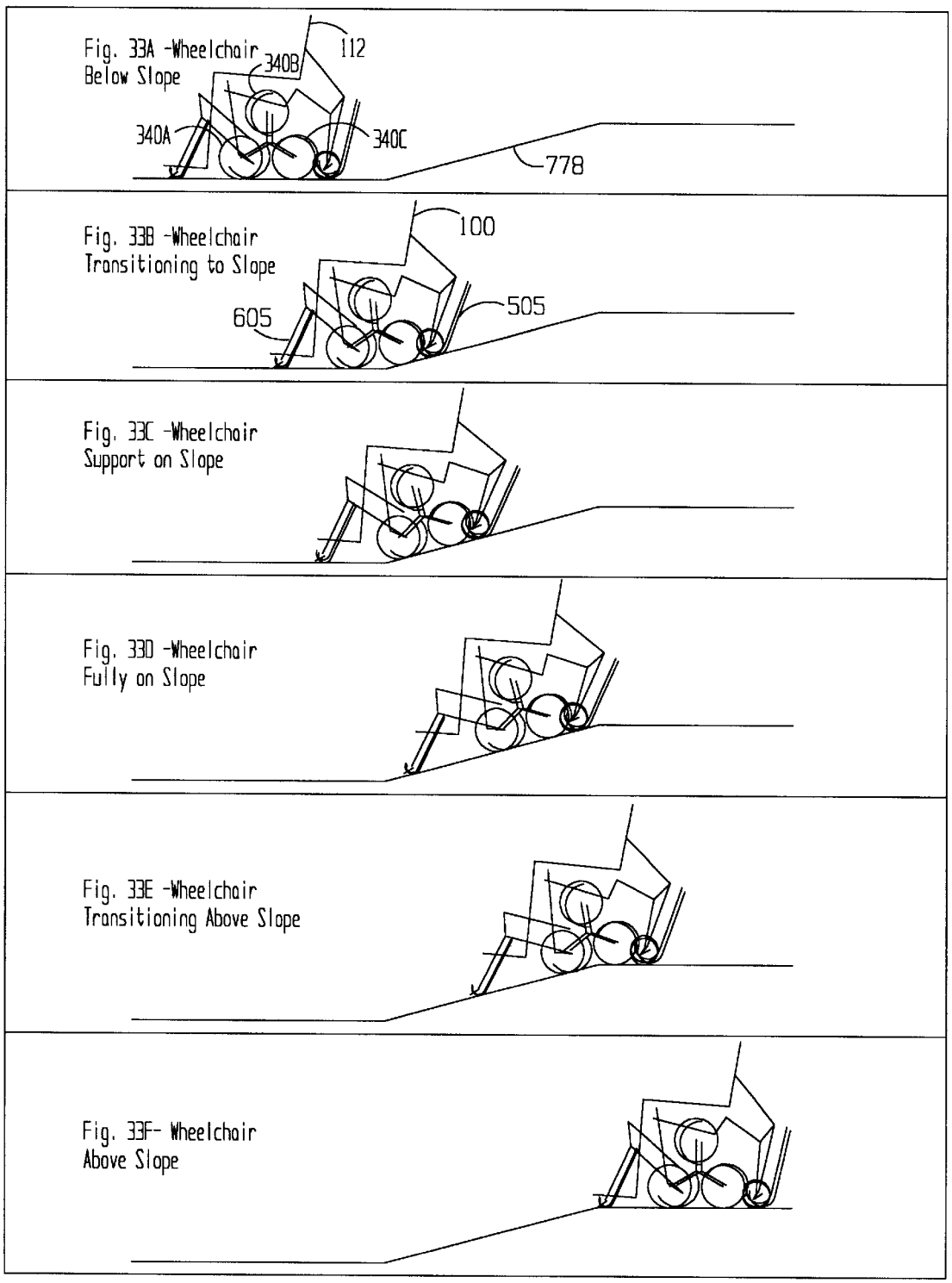
FIGS. 33A through 33F depict a series of the wheelchair positions as it negotiates a slope.

There are ten different stair-climbing regimes. See Table 4. FIG. 30C shows the flow chart for activating each of the ten stair-climbing regimes. The motion equations of each axis are listed in FIGS. 31A and 31B for each regime. Other control system variables are listed in the other tables.

Equation Variable Values

The variables in the equations and charts of FIGS. 30 and 31 may represent voltage values, or logic values. For JLA and JLB, −12 to +12 volts represents joystick 50 inputs for full speed backward to full speed forward. For JLE, 0 to +12 volts represents driving the various functions from stopped to full speed. For SPA, −12 to +12 volts represents driving the spider wheels 332 and 334 from full speed counterclockwise to full speed clockwise. For KEA, −12 to +12 volts represents driving the front skids actuator 621 at full speed retracting to full speed extending. Extending, or lengthening, the front skids actuator 621 lowers the skids 605. For CEA, −12 to +12 volts represents driving the front skids actuator 621 and caster actuator 521 at full speed extending to full speed retracting. Extending the rear caster actuator raises the rear caster 502. For CAA, −0.06 to +0.06 volts represents a pitch attitude of −1 to +1 degree. For SGA, KGA, CSA, and CGRA; 0 to +12 volts represents no deflection or no engagement to full deflection or full engagement. Where full deflection indicates a supporting load. SGA is the maximum deflection of either left or right spider engagement cams 433 or 434. KGA is the maximum deflection of either left or right front skids 605. CSA is the maximum of either left or right rear skids 505, or rear caster 502. Logic values are 0 for false and 1 for true.

FIG. 30C—Stair Climbing

The meaning of letter codes used in the stair mode flow chart in FIG. 30C are shown in Tables 1–5. If the joystick 50 is not deflected then no motion occurs. See path 720. If the joystick 50 is deflected aft, or to the rear, then stair ascending regimes are activated (JBL). See path 721. If the joystick 50 is deflected forward then the stair descending regimes are activated (JAL). See path 722.

FIG. 31A—Ascending Equations

The following conditions are for an aft joystick 50 and wheelchair 112 in the stair mode (JBL and MSL). See Path 721.

RBLA—Approach Ascending Stairs-Movement and Adjustment

If a spider spoke 330 angle is between 24° and 31° (SP1L), front skids 605 are high relative to the wheelchair 112 (1-KKL), and spider wheels 332 and 334 are not engaged with the stairs (1-SPCDL) then the Approach Ascending Stairs (AAL) criteria is met. If the spider spoke angle is between 28.6° and 31° (SP5L) and the balancing devices 650 are near the stairs or floor (NSDL), then the Approach Ascending Stairs-Movement and Adjustment Regime (RBLA) is activated. The wheelchair 112 begins to back and adjust the front skids 605 and rear caster 502 per equations in FIG. 31A. See path 723. The balancing devices 650 consist of the front skids 605 and rear skids 505 or rear caster 502. In this regime the spider wheels 332 and 334 are maintained at an angle relative to the frame 100. Pitch attitude (CAA) is not used for control in either approach ascending regimes: RBLA or RALA.

RALA—Approach Ascending Stairs-Adjustment Only

If the Approach Ascending Stairs criteria (AAL) is met but either the balancing devices 650 are not near the stairs or floor (1-NSDL) or a spider spoke 330 is not between 28.6° and 31° (1-SP5L) then Approach Ascending Stairs-Pitch Adjustment Only regime (RALA) is activated. See path 724. The control system 801 begins to level the wheelchair 112 by adjusting the spider wheels 332 and 334, front skids 605, rear skids 505, and rear caster 502 per equations in FIG. 31A.

RBLB—Ascending Stairs-Movement and Adjustment

If the stair mode is active (MSL) and the joystick 50 is aft (JBL) and the approach ascending stairs criteria has not been met (1-AAL), then the Ascending Stairs criteria is met (ABL). Then if the wheelchair 112 attitude is also in the ascend movement range (>−2° pitch <2°) (AAML), then the Ascending Stairs-Movement regime (RBLB) is activated. See path 725. The wheelchair 112 backs, rotates the spider wheels 332 and 334 clockwise, and adjust the balancing devices 650 to level the wheelchair 112 per the equations of FIG. 31A (RBLB).

RALB—Ascending Stairs Pitch-Adjustment Only

If the criteria for RBLB is met except that the wheelchair 112 pitch is not in the ascend range (>−2° pitch <2°) (AAML) but is in the adjustment range (>−6° pitch <6°) (ASL), then the Ascending Stairs-Adjustment regime (RALB) is activated. See path 726. The wheelchair 112 adjusts the balancing devices 650 to level the wheelchair 112 per the equations of FIG. 31A.

In the unlikely condition that the wheelchair 112 is in the stair mode (MSL), the joystick 50 is aft (JBL) and none of the above conditions is met, then the wheelchair 112 stalls. See path 727.

FIG. 31B—Descending Equations

The following conditions are for a forward joystick 50 in the stair mode (JAL and MSL). See path 722. If the spider wheel spoke 330 angle is between 27.6° and 35° (SP2L), the rear caster 502 is down or near down (CIL), the spider wheels 332 and 334 are not engaged with the stairs (1-SPCDL) then one of the Approach Descending Stairs regimes is activated (ADL) by the control system 801. See path 730.

RBLD—Approach Descending Stairs-Movement and Adjustment

If ADL criteria is met and the pitch attitude is >−4° and <1° (ADML), the balancing devices 650 are near the stairs or floor (NSDL), and both the front skids 605 and rear skids 505 or rear caster 502 are not loaded (NBSTL), then the Approach Descending Stairs-Movement regime is activated (RBLD). The wheelchair 112 begins to approach descending stairs per equations of FIG. 31B. See path 731. The drive wheels 340 and 342 move the wheelchair 112 forward. The spider wheels 332 and 334 rotate as required to maintain the wheelchair 112 within the descend attitude (ADML). The front skids 605 and rear skids 505 are operated as required to keep them in the middle of their engagement ranges. The front skids 605 engagement ranges from the skid runner 606 just contacting the stairs to being fully deflected and is measured by linkage 607 which is monitored by the potentiometer 608. See earlier explanation in paragraph entitled FIG. 23—Skid Engagement Reading. The other balancing devices 650 have similar ranges and measurements.

RALD—Approach Descending Stair-Adjustment Only

If the ADL criteria is met, the RBLD criteria is not met, and the pitch attitude (CAA) is within the descend adjustment range (>−6° pitch <6°) (ASL), then the Approach Descending Stair-Pitch Adjustment Only regime (RALD) is activated. See path 732. The spider wheels 332 and 334 and balancing devices 650 adjust the pitch attitude per equations in FIG. 31B. The spider wheels 332 and 334 rotate as required to move the wheelchair 112 pitch attitude to the descending attitude range >−4° and <1° (ADML). The front skids 605 and rear skids 505 are operated as required to keep them in the middle of their engagement ranges to the stairs.

RBLE—Descending Stairs-Movement and Adjustment

If the criteria for the Beginning Descent is not met (1-ADL), a spider spoke 330 angle is between 24° and 31° (SP1L), front skids 605 are high relative to the wheelchair 112 (1-KKL), and the rear caster 502 is not down or near down (1-CIL), then the criteria for End Descending Stairs (AFL) is met. See path 737, RBLF and RALF below.

If the stair mode is active (MSL), the joystick 50 is forward (JAL), the Approach Descending Stair regime is not active (1-ADL), and the End Descending Stair regime is not met (1-AFL), then the criteria for Descending Stairs regime is met (AEL). See path 738. If also, the pitch attitude is >−4° and <1° (ADML), and the balancing devices 650 are near the stairs or floor (NSDL); then the Descending Stairs-Movement regime is activated (RBLE). See path 733. The wheelchair 112 descends the stairs per equations on FIG. 31B. The drive wheels 340 and 342 advance and rotate proportionally to the engagement to the stairs of the spider wheels 332 and 334 and balancing devices 650. The spider wheels 332 and 334 rotate as a function of their engagement and the balancing devices 650 engagements. These movements are stopped if the balancing devices 650 become suspended. The balancing devices 650 operate at rates which maintain the wheelchair 112 at the proper pitch attitude.

RALE—Descending Stairs-Adjustment Only

If the AEL criteria is met but not the RBLE criteria and the pitch is in the adjustment range of >−6° and <6° (ASL) then the Descending Stair-Pitch Adjustment Only regime (RALE) is activated. See path 734. The balancing devices

650 adjust the attitude per equations in FIG. 31B. The balancing devices 650 operate to move the wheelchair 112 to the ADML pitch attitude and move the devices 650 near the stairs.

RBLF—End Descending Stairs-Movement and Adjustment

For End Descending Stairs (AFL) criteria, see path 737 and criteria above in RBLE—Descending Stairs-Movement paragraph. If the End Descending Stairs criteria (AFL) is met and one spider spoke 330 angle is between 28.6° and 31° (SP5L), then the End Descending Stairs-Movement regime is activated (RBLF). See path 735. The wheelchair's 112 control system 801 advances the drive wheels 340 and 342 at a rate that maintains the rear skids 505 or rear caster 502 engaged with the stairs. The balancing devices 650 are also driven at rates that maintain them in their engagement ranges per equations in FIG. 31B. This continues as long as the RBLF criteria is met and the joystick 50 is deflected. In this regime the spider wheels 332 and 334 are maintained at an angle to the frame 100. Pitch attitude is not used for control in either End Descending Stairs regime, RBLF or RALF.

RALF—End Descending Stairs-Adjustment Only

If the AFL criteria is met but not the RBLF criteria, then the End Descending Stairs-Adjustment range (RALF) is activated. See path 736. The control system 801 uses equations in FIG. 31B to rotate the spider wheels 332 and 334 to the SP5L range. If one spider spoke 330 is in the 24.0 to 28.6°(SP1L & 1-SP5L) range, the spider 330 will be rotated clockwise to the SP5L range. If one spoke 330 is between 31° to 35° range (SP6L & 1-SP5L), the spider spoke 330 will be rotated counterclockwise to the SP5L range. The balancing devices 650 are operated to keep them engaged or near the stairs.

Wheelchair Control

The control system 801 includes a computer with software codes to provide control of the wheelchair 112. FIGS. 30A, 30B, and 30C, as were discussed earlier, diagram the logic and equations of these software codes.

Figure 21:
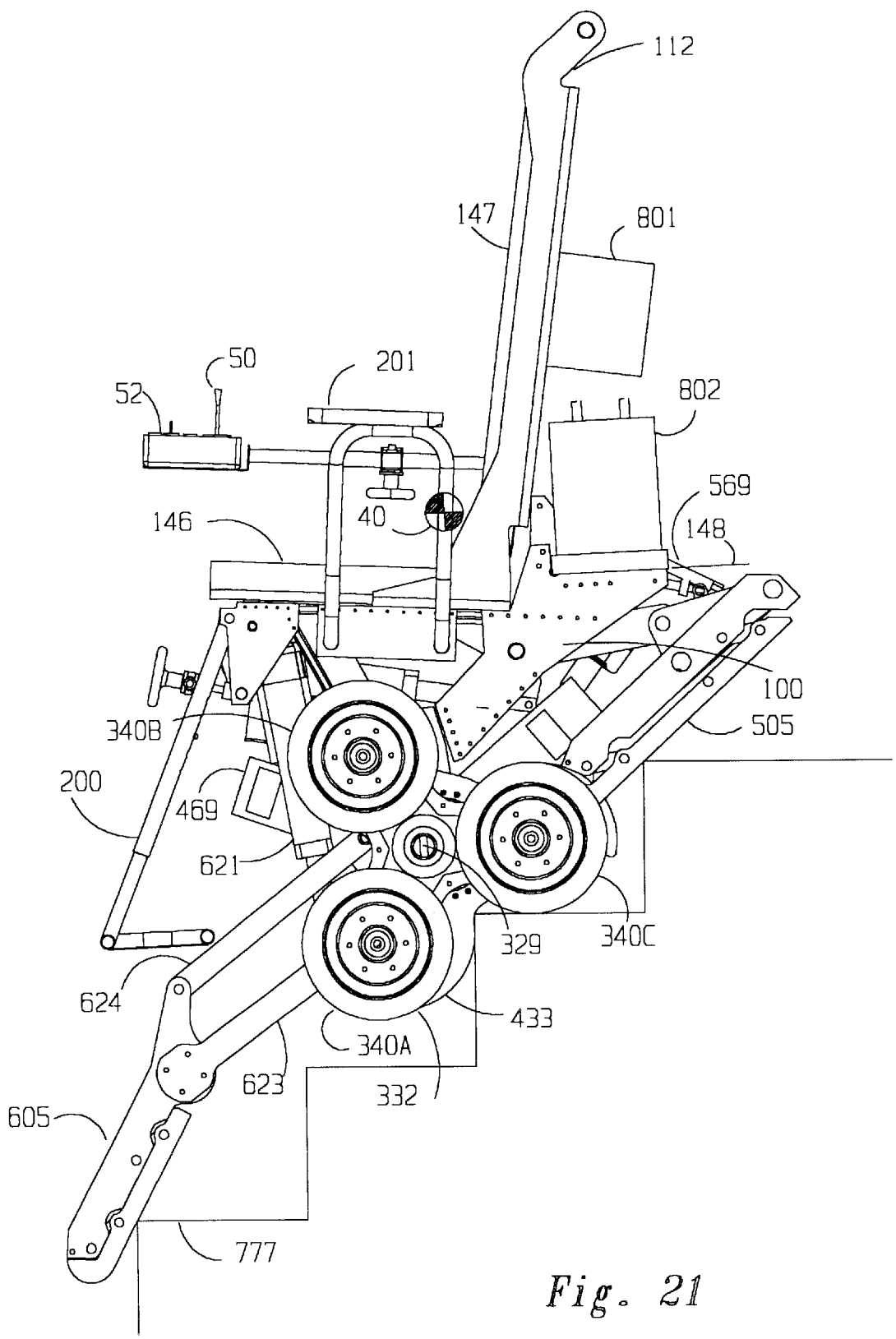
FIG. 21 is a side elevation view of the wheelchair in its stair-climbing mode.

FIGS. 20, 21—Climbing Sequence

Turning next to the series of figures that together comprise FIG. 20, the sequence of steps for climbing stairs is shown. In FIG. 20A, the wheelchair 112 is shown in a challenging situation: a stair-landing wall 775 in front of the wheelchair 112 and stairs at the rear with little extra horizontal space between them. The wheelchair 112 is well adapted to accommodate this situation. The front skids 605 fit compactly in the wheelchair 112 configured for the level mode, but stretch out to provide stability on stairs. The rear skids 505 and rear caster 502 are repositioned for stair climbing without requiring any extra space between the stairs and rear caster 502 or rear skids 505.

The front skids 605 are short links and members of a skid linkage 635, rather than being one piece long links that are pivoted from the front lower corners of wheelchair 112. Note that FIG. 29 shows a schematic example of long link skids 640. The short articulated links 605 are preferred for several reasons. The skid ends 609 can be lowered immediately to the floor upon activation of the stair mode (MSL) without interference from a stair-landing wall 775 as shown in FIG. 20A. Thus they are available immediately for balancing support. Since there is no delay, no special logic is required to decide when to lower them and no alternative device is necessary to prevent tipping forward. Also the shorter skids linkage 635 provides less interference when the driver is transferring to and from the seat 146.

The wheelchair 112 faces down the stairs during both ascending and descending operations. See FIG. 21 for a side view of the wheelchair 112 on stairs.

FIGS. 20A, 20B, 17—Beginning Ascent

To climb stairs, the driver backs the wheelchair 112 near the stairs (FIG. 20A) and then requests the stair mode (MSL). The wheelchair 112 control system 801 uses the control codes as were previously discussed. When the wheelchair 112 is backed, the wheelchair 112 is maintained level, the front skids 605 and rear skids 505 are maintained near to the floor 776 or stairs 777. The rear skids 505 contact the first stair riser (FIG. 20B) and are raised as required to keep them near the stairs but not loaded against the stair riser. This continues as long as the joystick 50 is deflected aft. Notice at this point the rear caster 502 is lifted off the floor 776, the axis 503 is tilted, and the eccentric weight of caster wheels 544 is free to swing them to the trailing position. See FIG. 17. Also notice that the rear caster 502 is caused to move upward and inward toward the wheelchair 112 along with the rear skids 505. The rear skids 505 are able to provide rear tip back support while the rear caster 502 is being retracted.

Center of Gravity Location Control

For stair climbing, it is desirable to support as much weight as possible by the active climbing devices, the spider wheels 332 and 334. This maximizes the available traction of the spider wheels and minimizes the traction required by the spider wheels to overcome the resisting friction of the balancing devices 650. Maximum support on the spider wheels 332 and 334 requires both front and rear supporting devices to maintain balance.

Since the combination center of gravity 40 of the wheelchair 112 with driver is high relative to the axis 329, raising the pitch attitude of the front of the wheelchair 112 can shift the center of gravity 40 aft. Lowering the pitch attitude shifts the center of gravity 40 forward. This method is used to stabilize the wheelchair 112 by maintaining the center of gravity 40 within a minimal fore and aft horizontal distance. This is done by the use of the balancing devices 650.

A concern of this method is that the center of gravity 40 may move forward or behind the axis 329 at a time which would tend to tip the wheelchair 112 forward or backward. This concern is avoided by implementing support with the balancing devices 650.

FIG. 29—Load Ranges

Shifting more of the balancing load to the front skids 605 is helpful to descending as will become obvious later. Thus it is desirable to maintain the center of gravity 40 at a range of locations that are shifted forward for ascending. Shifting more of the balancing load to the rear skids 505 is helpful for ascending stairs. Thus it is desirable to maintain the center of gravity 40 a range of locations that are generally shifted aft for descending.

Adjustment of the wheelchair 112 pitch is used to control the fore and aft location of the center of gravity 40 of the wheelchair 112. In FIG. 29, numerical values are shown to define the preferred pitch angles for ascending, descending, and pitch attitude adjusting. The actual values are not significant and may vary. One tolerance range of pitch angles is preferred for ascending; a second tolerance range of pitch angles is as preferred for descending. The ascending pitch range is generally higher than the pitch range for descending. A range of angles is accommodated rather than a target angle so that fewer and smaller pitch adjustments are required.

FIGS. 20C, 20D—Ascending Stairs

When the spider wheel 332 is engaged against the stair riser as shown in FIG. 20C, spider wheel 332 rotation is begun. Meanwhile front skids 605 and rear skids 505 are moved as required to maintain the wheelchair 112 level and keep both near the stairs 777 or floor 776. In FIG. 20D a drive wheel 340 reaches the tread of the first step 777. At this point, the wheelchair 112 also backs as required to keep the spider wheel 332 close to the stair riser.

FIGS. 20E through 20L—Ascending Stairs

At FIG. 20E, the spider wheels 332 and 334 have rotated and the wheelchair 112 is backed so that the spider wheel 332 is engaged against the riser of the second step 777. Climbing continues in the same manner through FIG. 20J when the rear caster 502 and two drive wheels 340 and 342 of each spider wheel 332 and 334 are resting on the top landing. The front skids 605 continue to track near the stairs through FIG. 20L. Notice that this tracking of the front skids 605 maintains protection against tipping forward until the wheelchair 112 is fully on the top landing.

Figure 8:
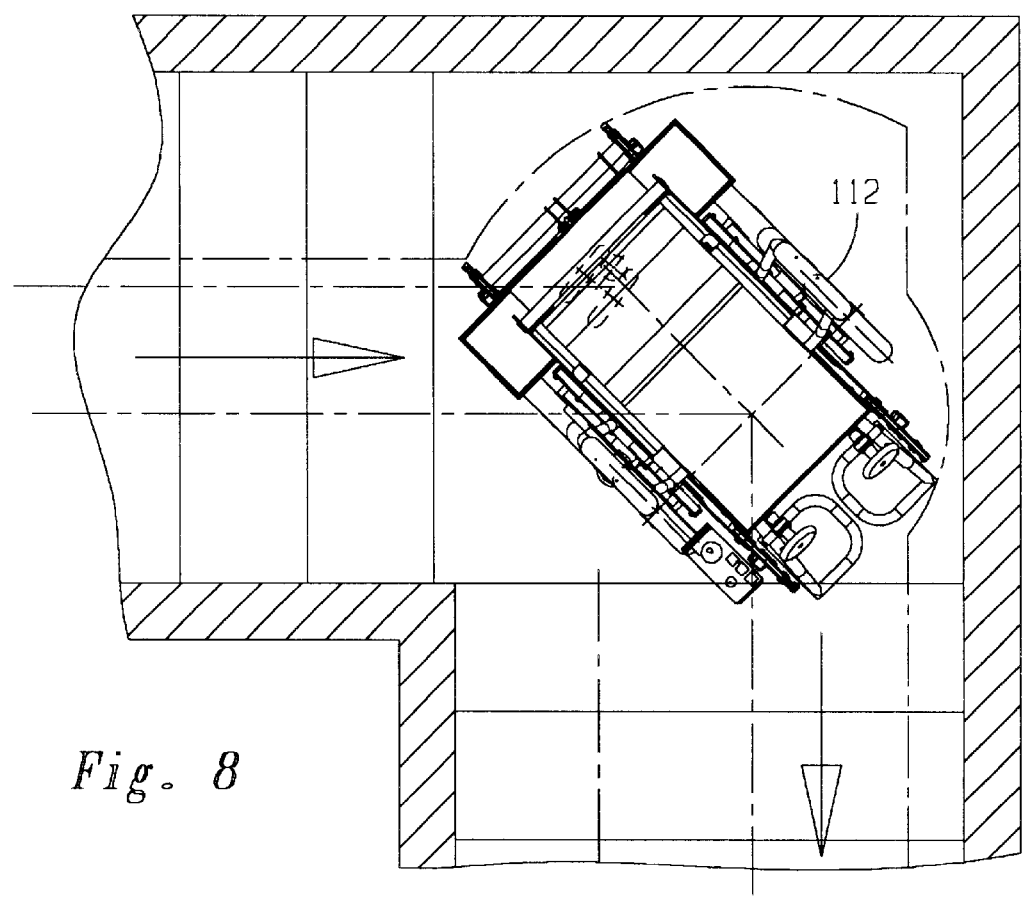
FIG. 8 is a view that illustrates the wheelchair's ability to turn 90-degrees on a 91.4-centimeter (36-inch) square stair landing.
Figure 9:
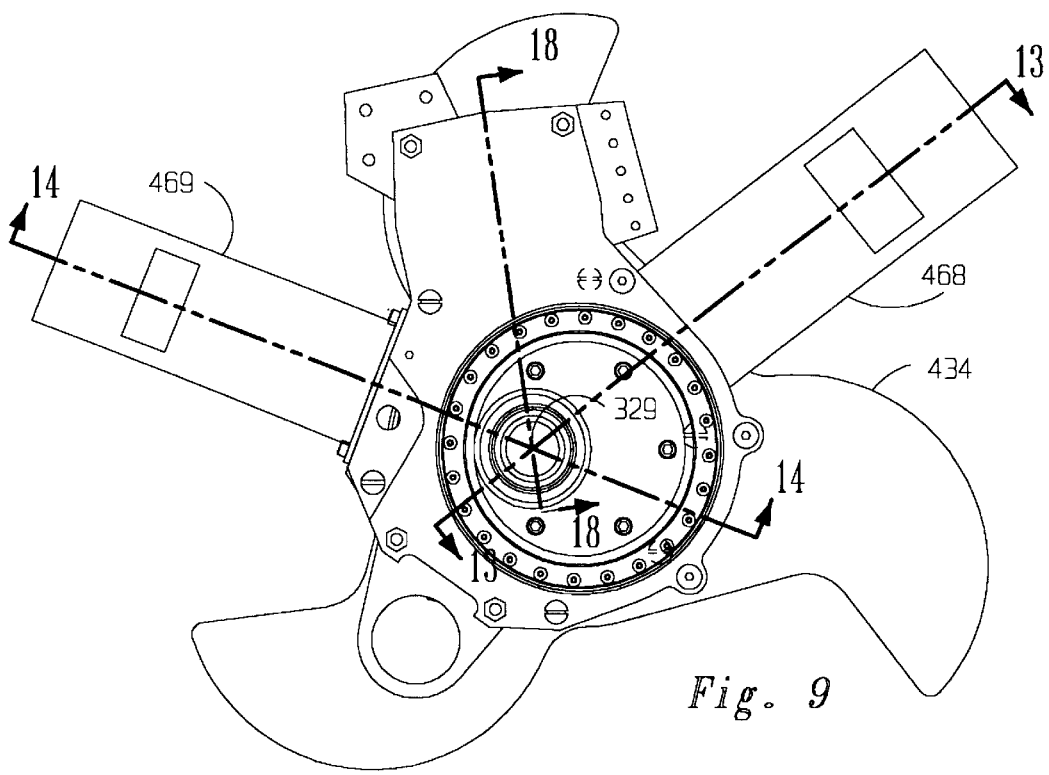
FIG. 9 is a fragmentary side view of a spider wheel and propulsion drive unit.

FIG. 8—Transition to Level on Stair Landing

Operational algorithms in the controls system 801 do not permit activation of the level mode (MSL) of operation until the front skids 605 reach the top landing. At this point, the level mode (MSL) can be activated and the wheelchair 112 can turn on the stair landing as shown in FIG. 8 if needed.

FIGS. 20L to 20A—Descending Stairs

The wheelchair 112 descends the stairs in a manner similar to ascending, by following FIG. 20 in the reverse order that is:

FIGS. 20L through 20A. Again referring to FIG. 20L, the wheelchair 112 approaches the stairs facing down. The driver pushes the stair switch 55 to request the stair mode (MSL). During FIG. 20L through 20J, the front skids 605 follow or track near the stairs. Notice that the tip forward hazard avoidance is in place long before the drive wheel 340A begins to descend the stairs.

FIGS. 20J through 20H—Descending Stairs

At FIG. 20J the spider wheel 332 begins to rotate as the drive wheels 340 advance while keeping the wheelchair 112 level and the spider wheel 332, front skids 605, and rear skids 505 either supporting or near the stairs or floor. The forward drive wheel 340A rolls over the edge of the top of the stairs and descends to the next lower step. The spider wheel 332 rotates in the same direction as the drive wheel 340. Referring to FIG. 20H, continued spider wheel 332 rotation lifts the aft drive wheel 340C off of the top step. The wheelchair 112 continues down the steps and the wheelchair 112 controls alternately retracts the front skids 605 and propels the wheelchair 112 while maintaining a −4° to +1° pitch attitude(ADML).

FIG. 20A—End Descending Stairs

The wheelchair 112 proceeds down the stairs with the pitch attitude being maintained by raising and lowering the front skids 605. When all supports are again on the same level (FIG. 20A), the level mode (MSL) may be activated. The wheelchair 112 can then turn on the stair landing or resume normal level operation. Following level mode (MSL) activation; the front skids 605 are retracted, and the rear caster 502 and skids 505 are deployed, and the spider wheel 332 is rotated to 28° as previously described. Once the rear caster 502, front skids 605, rear skids 505, and spider wheel 332 are repositioned, the wheelchair 112 resumes conventional operation.

Attitude Adjustment

In the unlikely event that the wheelchair 112 pitch attitude should exceed the normal operating range (AAML or ADML), the spider wheel 332 and drive wheel 340 motion is stopped. The attitude of the wheelchair 112 is then adjusted back to the ascend pitch (AAML) or descend pitch (ADML) range provided that the wheelchair 112 attitude is within the adjustment range (ASL) and the joystick 50 is deflected. The pitch is not adjusted from outside the adjustment range (ASL) in the event that a malfunction might have cause the adjustment to be in the wrong direction.

FIGS. 30A, 30D, 32, 33A–33F—Steep Slope Climbing

The wheelchair 112 may negotiate steep slopes in the slope mode (MPL). See FIG. 32. To ascend a slope, the driver backs the wheelchair 112 up to the slope and requests the slope mode (MPL). See FIG. 33 and path 741 on FIG. 30A.

When wheelchair pitch attitude is in the adjustment range (ASL) of greater than −6° and less than 6°, the front skids 605 and rear skids 505 and caster 502 are operational. See path 744 on FIG. 30D. The spider wheels 332 and 334 are operated at speeds proportional to the spider wheel command signal (SPA). This adjust the wheelchair 112 pitch attitude toward the level position. The front skids 605 operate at a speed and direction that is proportional to the skid command signal (KEA). The rear skid 505 and caster 502 operate at a speed and direction that is proportional to the caster command signal (CEA). This adjusts the balancing devices 650 as required to maintain them close to the ground, but not supporting the wheelchair 112 during motion. If the attitude in not in the adjustment range (ASL) then no skid 605, caster 502, or spider wheels 332 and 334 motion is permitted. See path 745.

When wheelchair pitch attitude is in the slope motion range of greater than −2° and less than 2° (APML), the caster 502 or rear skids 505 are not supporting (1-CSUPL), and the front skids 605 are not supporting (1-SSUPL), then the drive wheels 340 and 342 are operational in addition to the other devices from path 744. The left drive wheels 340 are operated at a speed and direction that is proportional to the left motor drive command (DLA). The right drive wheels 342 are operated a speed and direction that is proportional to the right motor drive command (DRA). See path 742. If the attitude is not in the slope movement range (APML), then no drive wheel 340 and 342 motion is permitted. See path 743.

In FIG. 33A, the wheelchair 112 is below a slope 778 and on a flat surface. FIG. 33B shows the wheelchair transitioning to the slope 778. The caster 502 is following the slope 778 contour. The spider wheels 332 and 334 have rotated as required to maintain the frame 100 level. In FIG. 33C, the spider wheels 332 and 334 and rear caster 502 are all on the slope. The wheelchair 112 continues climbing in FIG. 33D to FIG. 33F.

In FIG. 33F at the top of the slope when the front skids 605 are at the raised position, the spider wheels 332 and 334 are level and the rear caster 502 is near down, the control system 801 permits the activation of the level operation mode (MLL).

Descending slope operation is similar to ascending. The driver approaches the slope and requests the slope mode (MPL). He or she then moves the joystick 50 forward and begins to descend, following FIG. 33F to FIG. 33A.

FIGS. 30A, 30E, 34A–34C—Reclining

The wheelchair 112 may rotate seat 146 and seat back 147 in the recline mode (MRL). To recline, the driver requests the recline mode (MRL) by depressing the recline switch 57 while in the level mode (MLL). See FIG. 25 and path 754 in FIG. 30A. The wheelchair 112 moves to recline when the joystick 50 is moved aft. All motion stops when the joystick 50 is released or returns to center. The wheelchair 112 moves toward the level position when the joystick 50 is moved forward.

When wheelchair pitch attitude is not in the recline adjustment range (1-ARML), or less than −6° or greater than 15°, the front skids 605 are not operational. See path 748 on FIG. 30E. When the pitch attitude is in the adjustment range (ARML) then the front skids 605 are operational. See path 749. The front skids 605 operate at a speed and direction that is proportional to the skid command signal (KEA=JLE *(4-KGA)/6)). This adjusts the front skids 605 as required to maintain them close to the ground, but not supporting the wheelchair 112 during reclining or un-reclining motion. Note rather the ARML range being −44° to 35°, the range is 76° to 120° and 0° to 35° to avoid negative THETA values. See earlier discussion of THETA.

When the wheelchair 112 is in the adjustment range (ARML), the balancing devices 650 are not suspended (NSDL), and the spider wheels 332 and 334 are in the range for reclining (SP7L) the spider wheels 332 and 334 are operational. The spider wheels 332 and 334 are operated at a speed and direction proportional to the spider wheel command signal (SPA=JLA). The joystick 50 command JLA is negative when the joystick 50 is moved aft and positive when it is moved forward. No motion occurs when the joystick 50 is centered and the JLA command is zero. This adjusts the wheelchair 112 pitch attitude to recline, stop in place, or return to the level position. See path 747. If criteria is not met then no spider wheels 332 and 334 motion is permitted. See path 751. The drive wheels 340 and 342 are not permitted to move during reclining. See path 746.

In FIG. 34A, the wheelchair 112 is in the level position on a flat surface prior to reclining. FIG. 34B shows the wheelchair in an intermediate reclining position. The front skids 605 have moved close to the floor. The spider wheel 332 has rotated to lift the drive wheel 340C further off the floor. The wheelchair is supported by the front drive wheels 340A and 342A and the rear caster 502. In FIG. 34C, the wheelchair 112 is fully reclined. The wheelchair 112 returns to the level position by moving the joystick 50 forward. The level mode (MLL) is then selectable.

Conclusions, Ramifications, and Scope

Accordingly the reader will see that the battery powered wheelchair of this invention can be used by a broad range of persons who wish to have assistance traveling in homes and other places that have not been modified to accommodate customary wheelchairs. It accommodates those with limited reach and strength as well as persons of small or large stature. It does not require the user to be highly skilled in its use. The wheelchair 112 is always stable on stairs and steps even with loss of power or control system failure. The wheelchair accommodates steep slopes and reclines for the comfort of its driver.

Although the description above contains many specificities, these should not be construed as limiting the scope of the invention but as merely providing illustrations of some of the presently preferred embodiments of this invention. For example the spider wheels 332 and 334 could have four wheels instead of three, etc.; the control system 801 could be fully analog based; the device could be used to transport other cargo, mechanical arms, cameras etc.; the skids could use other technologies to sense distances to stair surfaces; different control equations could be used; alternate driver control devices could be provided for those who can better operate foot, voice, chin, eye motion, or pneumatic controls.

Thus the scope of the invention should be determined by the appended claims and their legal equivalents, rather than by the examples given.

I claim:

1. A battery-powered wheelchair being adapted for use in a level mode and a stair mode, comprising:
   (1) a frame including a seat upon which a driver is intended to sit and said frame defining a plane whose pitch attitude with respect to a level surface is capable of being measured,
   (2) a pitch-attitude-sensing means for sensing the pitch attitude of said frame with respect to said level surface,
   (3) a powered-pitch-attitude-adjustment means including at least one skid for changing the pitch attitude of said frame with respect to said level surface,
   (4) a control means for powering said powered-pitch-attitude-adjustment means in response to signals generated by said pitch-attitude-sensing means, and
   (5) a pair of spider wheels mounted for rotation with a spider wheel shaft about a central axis of rotation, and each spider wheel having multiple drive wheels, with no more than two of said multiple drive wheels per spider wheel being in supporting contact with the stairs at a given time, and said spider wheels being driven by a motor mounted to said frame.

2. The wheelchair of: claim 1 wherein a pre-selected range of acceptable pitch attitudes for said wheelchair is changeable in accordance with the activated mode for travel, whereby an acceptable deviation from an ideal pitch attitude during said stair mode may be established so as to be different from the acceptable pitch attitude deviation for said level mode.

3. The wheelchair of claim 1, further including a means for rotating each of the two spider wheels by a small angle during said level mode to the extent that only one drive wheel associated with a given spider wheel is in contact with the ground.

4. The wheelchair of claim 1, further including a caster mounted at the rear of the wheelchair and including means for retracting the caster so as to configure said wheelchair for stair negotiation.

5. The wheelchair of claim 1, further including a load-sensing means for sensing when said powered-pitch-attitude-adjustment means are extended and subjected to supporting surface contact loading.

6. The wheelchair of claim 5: wherein said load-sensing means comprises:
   (1) a runner-four-bar linkage with one link being a runner and said runner-four-bar linkage being supported by a skid link that may be raised and lowered,
   (2) with said runner having two short links attached to said skid link with rotable joints at either end of said two short links,
   (3) with a sensor capable of monitoring the rotation of at least one of the short links relative to the other links,
   (4) with said runner being biased away from said skid link by its own weight,
   (5) whereby some movement of the runner from the biased position is an indication that the runner has contact with a supporting surface, and
   (6) wherein full movement of the runner from the biased position is an indication that said runner is subjected to loading that provides balancing support of the wheelchair.

7. The wheelchair of claim 1, further including a forward-located-powered-pitch-attitude-adjustment means, an aft-located-powered-pitch-attitude-adjustment means, and a position-sensing means for detecting when:
   (1) said forward-located-powered-pitch-attitude-adjustment means is not below an intermediate position,
   (2) two of the drive wheels of each spider wheel are resting on the same level surface, and (3) said aft-located-powered-pitch-attitude-adjustment means is fully down or near down, wherein position sensing provided by said position-sensing means indicates that the wheelchair is resting on a level surface and conversion to the level mode would be safe and wherein said position sensing is used to permit said conversion to the level mode.

8. The wheelchair of: claim 7 wherein the load-sensing means includes:

(1) a caster, (2) said caster having a pivot shaft, (3) with said pivot shaft rotably mounted in an axis defined by two bearings, (4) with said pivot shaft having extra length thereby permitting it to slide along said axis defined by two bearings, (5) an end of a pivot arm resting on top surface of said pivot shaft, and (6) a sensor monitoring the rotation of said pivot arm, whereby some movement of said pivot arm from the lowest position is an indication that said caster has some contact with a supporting surface, and where full movement of the arm to the highest position is an indication that said load-sensing means is subjected to loading that provides balancing support of the wheelchair.

* * * * *